United States Patent
Angelsmark et al.

(10) Patent No.: US 9,807,161 B2
(45) Date of Patent: Oct. 31, 2017

(54) DISTRIBUTED EVENTS IN AN ACCESS CONTROL SYSTEM

(71) Applicant: Axis AB, Lund (SE)

(72) Inventors: Ola Angelsmark, Ystad (SE); Per Smitt, Malmö (SE)

(73) Assignee: Axis AB, Lund (SE)

( * ) Notice: Subject to any disclaimer, the term of this patent is extended or adjusted under 35 U.S.C. 154(b) by 209 days.

(21) Appl. No.: 14/028,198

(22) Filed: Sep. 16, 2013

(65) Prior Publication Data

US 2015/0081785 A1 Mar. 19, 2015

(51) Int. Cl.
G06F 15/16 (2006.01)
H04L 29/08 (2006.01)
G06F 9/54 (2006.01)
G06F 17/30 (2006.01)

(52) U.S. Cl.
CPC ............ *H04L 67/104* (2013.01); *G06F 9/542* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 4,581,606 A * | 4/1986 | Mallory | ................ | F25D 29/008 340/505 |
| 5,276,867 A * | 1/1994 | Kenley | .................... | G06F 12/08 |
| 5,555,404 A | 9/1996 | Torbjornsen et al. | | |
| 5,881,231 A * | 3/1999 | Takagi | ................ | H04L 12/2602 370/235 |
| 6,108,684 A * | 8/2000 | DeKoning | .............. | G06F 9/505 718/100 |
| 6,145,045 A * | 11/2000 | Falik | .................... | G06F 13/4295 370/464 |
| 6,185,613 B1 * | 2/2001 | Lawson | .................. | G06F 9/542 709/224 |
| 6,347,335 B1 | 2/2002 | Shagam et al. | | |
| 6,389,510 B1 * | 5/2002 | Chen | .................... | G06F 12/0866 707/E17.12 |
| 6,504,479 B1 * | 1/2003 | Lemons | ............. | G07C 9/00087 340/430 |
| 6,513,050 B1 * | 1/2003 | Williams | ............ | G06F 11/1451 |

(Continued)

OTHER PUBLICATIONS

European Search Report dated Dec. 12, 2013, issued in corresponding European application 13 185 580.1, 7 pages.

*Primary Examiner* — Viet Vu
*Assistant Examiner* — James Edwards
(74) *Attorney, Agent, or Firm* — Snyder, Clark, Lesch & Chung, LLP

(57) ABSTRACT

A method disclosed may include storing event data in a physical access control system originating from a first device of a plurality of security devices in a first data area of a memory. The method may include storing event data originating from devices other than the first device in a second data area. The method may include removing the event data from the first data area to prevent the first data area from occupying more than a first memory space and removing the event data from the second data area to prevent the second data area from occupying more than a second memory space. The method may include distributing the event data from the first data area to the other devices through a network interface.

24 Claims, 16 Drawing Sheets

(56) References Cited

U.S. PATENT DOCUMENTS

| | | | |
|---|---|---|---|
| 6,885,898 B1 | 4/2005 | Brown et al. | |
| 7,031,798 B2 | 4/2006 | Brown et al. | |
| 8,082,302 B2* | 12/2011 | Becker | G06Q 10/107 370/260 |
| 8,203,426 B1 | 6/2012 | Hirschfeld et al. | |
| 8,504,728 B1* | 8/2013 | Williams | H04L 9/0637 709/250 |
| 8,930,647 B1* | 1/2015 | Smith | G06F 9/44557 711/103 |
| 9,036,444 B1* | 5/2015 | Silberman | G06F 11/073 365/226 |
| 9,092,338 B1* | 7/2015 | Qiu | G06F 17/30864 |
| 9,185,137 B2* | 11/2015 | Amemiya | H04L 67/325 |
| 9,471,245 B1* | 10/2016 | Shilane | G06F 11/2056 |
| 2003/0154009 A1* | 8/2003 | Basir | G07C 5/0891 701/32.2 |
| 2004/0022099 A1* | 2/2004 | Ozawa | G06F 5/14 365/200 |
| 2004/0088393 A1* | 5/2004 | Bullen | H04L 41/0663 709/223 |
| 2005/0021575 A1* | 1/2005 | Boyd | G06F 17/30209 |
| 2005/0033962 A1* | 2/2005 | Libin | G07C 9/00103 713/170 |
| 2006/0236165 A1* | 10/2006 | Cepulis | G06F 11/1008 714/721 |
| 2008/0016240 A1* | 1/2008 | Balandin | G06F 17/30094 709/238 |
| 2008/0104339 A1* | 5/2008 | Nakagawa | G06F 3/0625 711/154 |
| 2008/0273623 A1* | 11/2008 | Chung | H04L 25/0264 375/295 |
| 2008/0309449 A1* | 12/2008 | Martin | G08B 25/08 340/3.1 |
| 2009/0161155 A1* | 6/2009 | Baba | H04N 1/32358 358/1.15 |
| 2009/0184835 A1* | 7/2009 | Deaver, Sr. | G08B 25/06 340/660 |
| 2010/0026811 A1* | 2/2010 | Palmer | H04N 7/181 348/159 |
| 2010/0077012 A1* | 3/2010 | Yogev | G06F 12/0238 707/822 |
| 2010/0332615 A1* | 12/2010 | Short | H04L 63/08 709/217 |
| 2010/0332777 A1* | 12/2010 | Tsai | G06F 11/1456 711/162 |
| 2011/0010518 A1* | 1/2011 | Kavuri | G06F 3/0647 711/165 |
| 2011/0225312 A1* | 9/2011 | Liu | H04L 12/18 709/231 |
| 2012/0059864 A1* | 3/2012 | Bandyopadhyay | H04L 67/1008 707/827 |
| 2012/0079096 A1* | 3/2012 | Cowan | G06F 11/3006 709/224 |
| 2012/0174182 A1 | 7/2012 | Neely | |
| 2012/0213362 A1* | 8/2012 | Bliding | G07C 9/00309 380/44 |
| 2012/0246303 A1* | 9/2012 | Petersen | G06F 17/30185 709/224 |
| 2012/0254520 A1* | 10/2012 | Roh | G06F 3/0638 711/103 |
| 2013/0117791 A1* | 5/2013 | Chennupati | H04N 21/43615 725/81 |
| 2013/0258110 A1* | 10/2013 | DeMarco | G08B 25/14 348/155 |
| 2013/0286842 A1* | 10/2013 | Nakatsugawa | H04L 47/125 370/235 |
| 2013/0344942 A1* | 12/2013 | Price | G07F 17/3241 463/25 |
| 2014/0136485 A1* | 5/2014 | Miyoshi | G06F 3/0617 707/654 |
| 2014/0250239 A1* | 9/2014 | Lambert | H04L 45/54 709/242 |
| 2014/0349750 A1* | 11/2014 | Thompson | A63F 13/12 463/31 |

* cited by examiner

DISTRIBUTED EVENTS IN AN ACCESS CONTROL SYSTEM

FIELD

This disclosure generally relates to distributing event data in a physical access control system.

BACKGROUND INFORMATION

Access control systems may be used to control physical access to a facility. An access control system (as well as other types of control systems) may have numerous controllers, each controlling a different part of the system. Each controller may store data about events, such as whether a user entered correct credentials into a card reader or whether a camera detected motion, for example.

SUMMARY

In one embodiment, a system may include a plurality of devices connected in a network. Each device may include a memory including a first data area to store event data originating at the corresponding device and a second data area to store event data originating from other devices of the plurality of devices. In one embodiment, the first data area is configured to occupy at most a first memory space and the second data area is configured to occupy at most a second memory space. Each device may include a processor to remove the event data from the first data area to prevent the first data area from occupying more than the first memory space, remove the event data from the second data area to prevent the second data area from occupying more than the second memory space, and distribute the event data from the first data area to the other devices through a network interface and to receive event data from the other devices through the network interface to store in the second data area.

In one embodiment, the plurality of devices are connected in a distributed peer-to-peer network and each processor in more than one of the plurality of devices is configured to distribute the event data in the respective first data area to other devices in the peer-to-peer network. In one embodiment, wherein each processor in more than one of the plurality of devices is configured to distribute the event data in the respective second data area to other devices in the peer-to-peer network.

One embodiment may include an additional device to communicate with one of the plurality of devices to request and receive the event data stored in the first data area or the event data stored in the second data area. In one embodiment, the first memory space is larger than the second memory space. In one embodiment, the plurality of devices may include a plurality of controllers in a physical access control system (PACS).

In one embodiment, the processor is configured to compare the event data in the first data area and the event data in the second data area to rules and issue an alarm based on the comparison.

In one embodiment, the processor is configured to remove the event data that is oldest from the first data area to prevent the first data area from occupying more than the first memory space, and remove the event data that is oldest from the second data area to prevent the second data area from occupying more than the second memory space.

In one embodiment, the processor is configured to prioritize distribution of event data from the first data area to another one of the devices, wherein the other one of the devices is associated with a subscription to the event data.

In one embodiment, the processor is configured to distribute the event data originating from the corresponding device to the other devices based on an amount of traffic in the network.

In one embodiment, the processor is configured to stop distributing the event data from the first data area to another one of the devices when an indication is received through the network interface from the other one of the devices to stop distributing the event data.

In one embodiment, the other one of the devices indicates to stop distributing the event data when the processor in the corresponding other device exceeds a processor load threshold.

In another embodiment, a device may include a memory including a first data area to store event data originating from the device and a second data area to store event data originating from one or more other devices connected in a peer-to-peer network with the device, wherein the first data area is configured to occupy at most a first memory space and the second data area is configured to occupy at most a second memory space. The device may include a processor to remove stored event data from the first data area to prevent the first data area from occupying more than the first memory space, remove the stored event data from the second data area to prevent the second data area from occupying more than the second memory space, and distribute, through a network interface, the event data from the first data area to the other devices and to receive, through the network interface, the event data from the other devices to store in the second data area.

In one embodiment, the processor is configured to distribute the event data in the first data area to other devices in the peer-to-peer network and to distribute the event data in second data area to other devices in the peer-to-peer network. In one embodiment, the first memory space is larger than the second memory space.

In one embodiment, the device may include a controller in a physical access control system (PACS).

In one embodiment, the processor is configured to compare event data in the first data area and event data in the second data area to rules and issue an alarm based on the comparison, to remove the event data that is oldest from the first data area to prevent the first data area from occupying more than the first memory space, and to remove the event data that is oldest from the second data area to prevent the second data area from occupying more than the second memory space.

In one embodiment, the processor is configured to prioritize distribution of event data from the first data area to another one of the devices, wherein the other one of the devices is associated with a subscription to the event data.

In one embodiment the processor is configured to distribute the event data from the first data area to the other devices based on an amount of traffic in the peer-to-peer network.

In another embodiment, a method may include storing event data originating from a first device of a plurality of devices in a first data area of a memory. The first data area is configured to occupy at most a first memory space, and wherein the plurality of devices are connected in a distributed peer-to-peer network. The method may include storing event data originating from devices other than the first device in a second data area, wherein the second data area is configured to occupy at most a second memory space. The method may include removing the event data from the first data area to prevent the first data area from occupying more than the first memory space, removing the event data from the second data area to prevent the second data area from occupying more than the second memory space; and distributing the event data from the first data area to the other devices through a network interface and receiving the event data from the other devices through the network interface to store in the second data area.

In one embodiment, the first memory space is larger than the second memory space. The method may include removing the event data that is oldest from the first data area to prevent the first data area from occupying more than the first memory space, and removing the event data that is oldest from the second data area to prevent the second data area from occupying more than the second memory space. The method may include prioritizing distribution of the event data from the first data area to another one of the devices, wherein the other one of the devices is associated with a subscription to the event data.

DETAILED DESCRIPTION OF EMBODIMENTS

The following detailed description refers to the accompanying drawings. The same reference numbers in different drawings identify the same or similar elements.

One embodiment described below relates to controllers in a physical access control systems (PACS). Other embodiments may include devices or systems other than a PACS, such as controllers in systems for controlling different applications within building management, monitoring, and security systems. One embodiment may include controllers in a home automation system, for example.

As mentioned above, a control system may have numerous controllers, each controlling a different part of the system. Each controller may store data about events, such as whether a user entered correct credentials into a card reader or whether a camera detected motion, for example. In one embodiment discussed below, the controllers store the event data in a distributed manner. Large volumes of event data, however, may overwhelm the controllers or the network at busy time periods. In one embodiment described below, a controller may reduce its own load and network traffic by distributing event data at less busy times, when another controller subscribes to event data, based on priority, etc.

In another embodiment, a controller may include two memory areas: a first memory area for storing event data originating at the controller and a second memory area for storing event data originating from other controllers. The first and second memory areas may be configured to occupy at most a first and second memory space, respectively. As a form of memory management (which may be limited), the first memory space for storing event data originating at the controller may be larger than the second memory space for storing event data originating from other controllers. Thus, the controller may store event data for itself for a longer period of time (for example) than other controllers. Nonetheless, because the other controllers do the same in a network (e.g., each storing more information about itself), a complete (or more complete) set of event data may be stored in the network of controllers. Further, this complete (or more complete) set of event data may be stored while not necessarily maintaining a central server to store the complete (or more complete) set of event data. Regardless, an administrative device (or a server) may still download the event data from the different controllers before, for example, the controller removes data in an effort from running out of memory. One or more embodiments below relate to the distribution of event data in a physical access control system (e.g., a distributed physical access control system) in a particular environment. As described, other embodiments may relate to the distribution of event data in other types of systems (e.g., other than a physical access control system).

Figure 1:
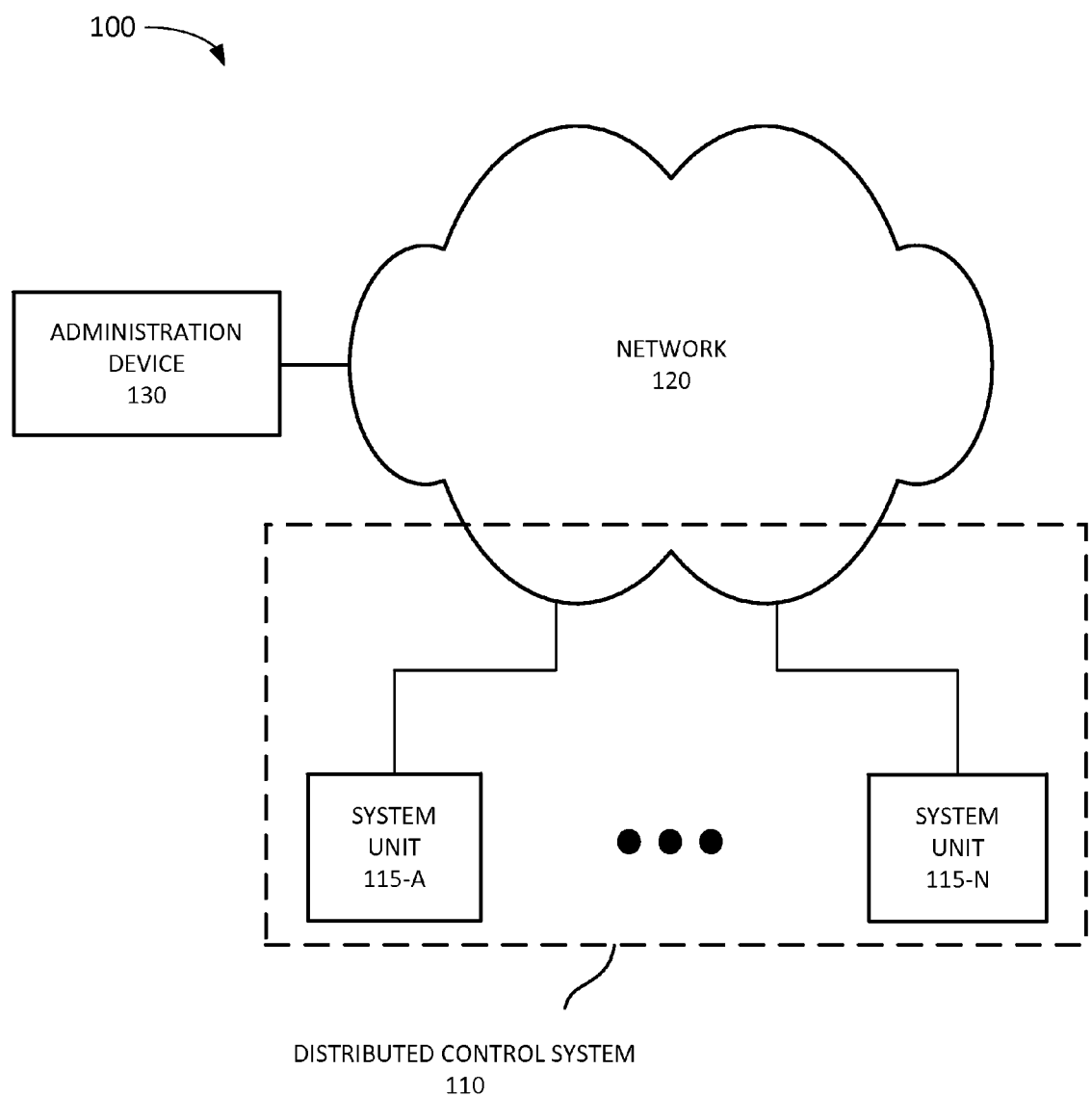
FIG. 1 is a block diagram illustrating an exemplary environment according to an embodiment described herein.

FIG. 1 is a block diagram of an exemplary environment 100 in which the systems and methods described below may be implemented. As shown in FIG. 1, environment 100 may include a distributed control system 110 (e.g., a distributed physical access control system), a network 120, and an administration device 130.

Distributed control system 110 may include a distributed computing system that includes system units 115-A to 115-N (referred to collectively as "system units 115" or "units 115," and individually as "unit 115"). Distributed control system 100 has a plurality of devices (units 115) connected in network 120. In one embodiment, system unit 115 includes a physical access control device. For example, system unit 115 may include a controller that controls access to a secure area, such as a room or a group of rooms. System unit 115 may receive credentials (e.g., access card credentials) via a reader device and may determine whether the credentials are authentic and associated with authority to access the secure area. If so, the controller may issue a command to open a lock on a door or perform other operations associated with granting access to the secure area.

Distributed control system 110 may include one or more distributed datasets. A distributed dataset includes data that is stored in a distributed (and potentially redundant) fashion in system units 115 that are associated with the distributed dataset. In one embodiment, distributed datasets are replicated on more than one device. For example, the entire distributed dataset may be stored in more than one of (e.g., each of) units 115. In another embodiment, one or more units 115 may store a subset of the distributed dataset. Also, a distributed dataset may be associated with all system units 115 or may be associated with a subset of system units 115.

In one embodiment, units 115 may reach a consensus in order to effect a change in the distributed dataset (e.g., a consensus-based distributed database). System unit 115 may propose a change to a consensus-based distributed dataset. If the change is accepted by a quorum of units 115 associated with the distributed dataset, units 115 may reach a consensus and propagate the change to each local copy of the distributed dataset in each associated unit 115. That is, a consensus with respect to a change in the distributed dataset may be reached if a quorum of the associated units 115 votes for the change.

In this context, a quorum may correspond to the smallest majority of the associated units 115. For example, if a distributed dataset is associated with N units 115, a quorum may be reached if N/2+1 associated units 115 vote for the change and N is an even number, or if (N−1)/2+1 associated units 115 votes for the change and N is an odd number. Requiring a smallest majority to reach a quorum may ensure that when considering two conflicting proposals, at least one system unit 115 receives both proposals and selects one of the proposals for consensus.

A consensus-based distributed dataset may ensure that any system unit 115 associated with the distributed dataset includes the information (e.g., all the information in one embodiment) managed by the distributed dataset. For example, a distributed dataset may include access rules and the access rules may be available to any system unit 115 associated with the distributed dataset. Thus, as a result of the one or more distributed datasets, in one embodiment, control system 110 may correspond to a decentralized system with no central controlling device, such as a server device. In other embodiments, control system 110 may include both a decentralized system and a central controlling device (such as a server device). Changes to control system 110 may be configured at any system unit 115 and if the change is associated with a distributed dataset, the change may be propagated to other system units 115 associated with the distributed dataset. Furthermore, control system 110 may exhibit robustness with respect to device failure, as a single point of failure may be avoided. For example, if a particular system unit 115 fails, the other units 115 may continue to operate without loss of data (or with the minimization of loss of data). In another embodiment, a change may be made to the distributed dataset without consensus.

Network 120 may enable units 115 to communicate with each other and/or may enable administration device 130 to communicate with particular units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 allows an administrator to connect to a particular unit 115 in order to configure control system 110, change a configuration of control system 110, receive information from control system 110, and/or otherwise administer control system 110. Administration device 130 may include any device configured for communicating with one or more of units 115. For example, administration device 130 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability. In one embodiment, administration device 130 may be part of unit 115. As such, an administrator may administer control system 110 from one or more of units 115.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100.

Figure 2A:
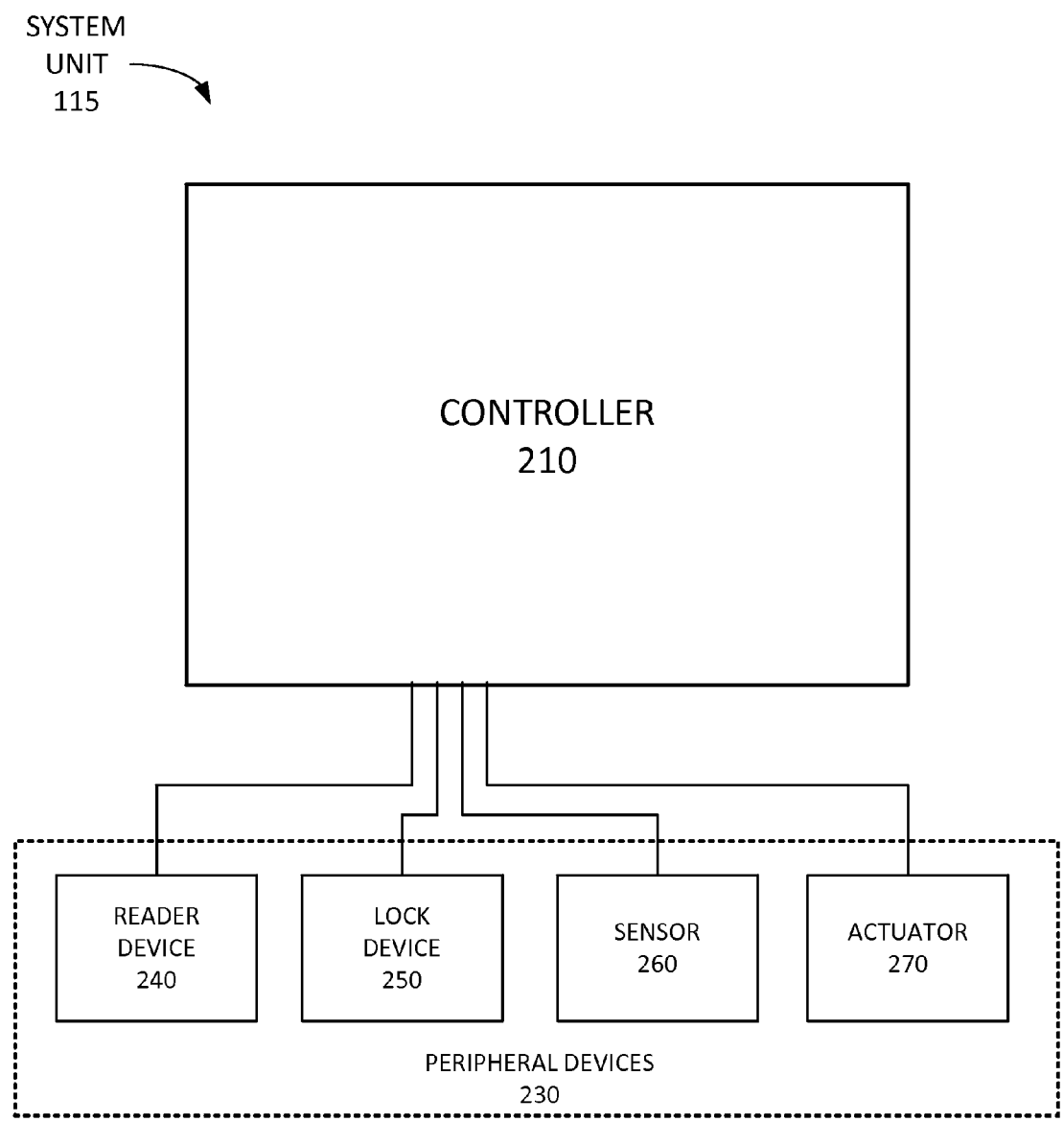
FIGS. 2A and 2B are block diagrams illustrating exemplary components of the system unit of FIG. 1.
Figure 2B:
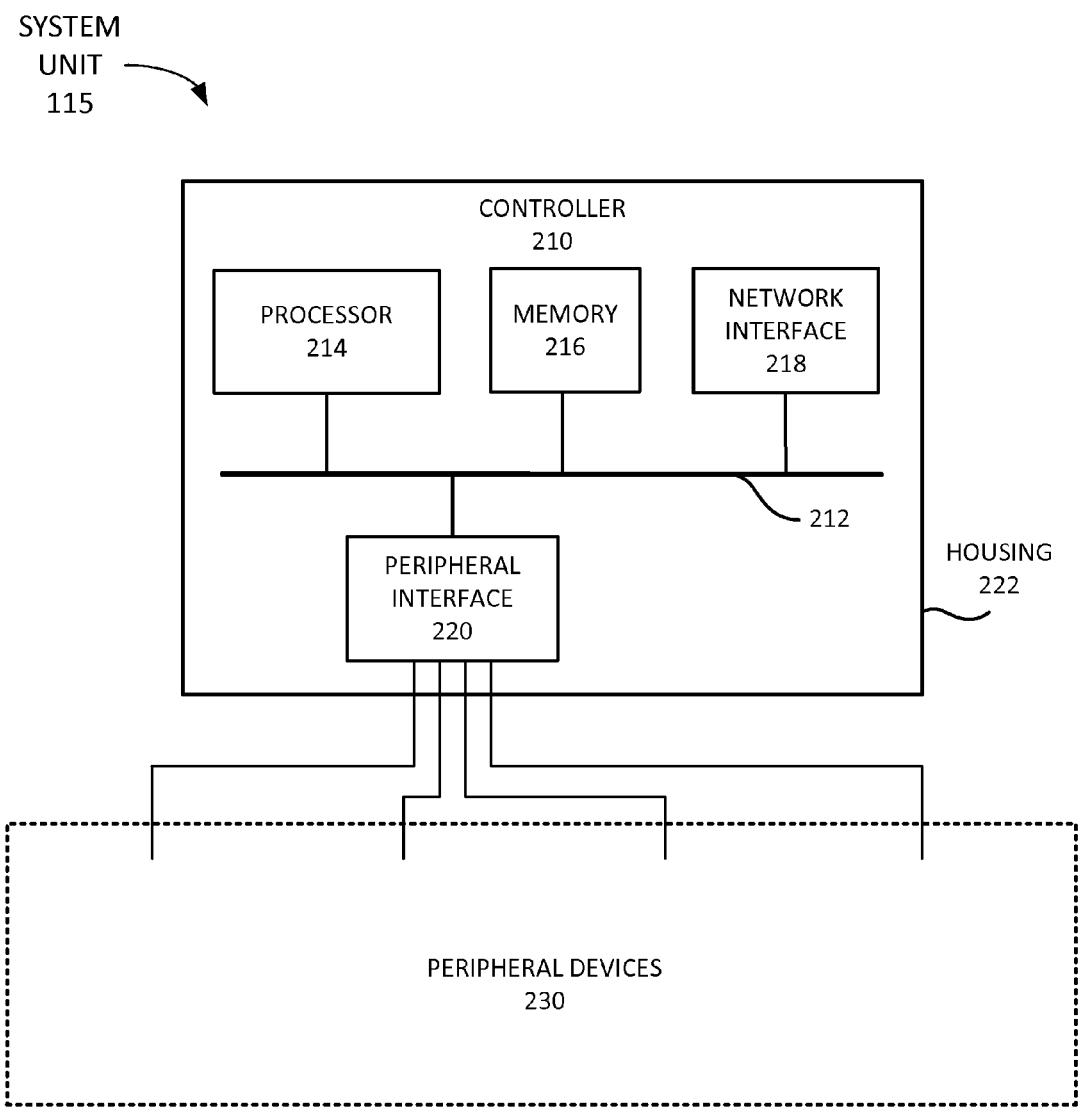

FIGS. 2A and 2B are block diagrams illustrating exemplary components of a unit 115. As shown in FIG. 2A, unit 115 may include a controller 210 and one or more peripheral devices 230. Controller 210 may control the operation of unit 115, may communicate with other units 115, may communicate with administration device 130, and/or may control peripheral devices 230. Peripheral devices 230 may include devices that provide information to controller 210, that are controlled by controller 210, and/or that otherwise communicate with controller 210. In one embodiment, peripheral devices 230 may include any type of security device. For example, peripheral devices 230 may include security devices, such as a reader device 240, a lock device 250, a sensor 260 (e.g., a camera), and/or an actuator 270.

As shown in FIG. 2B, controller 210 may include a bus 212, a processor 214, a memory 216, a network interface 218, a peripheral interface 220, and a housing 222. Bus 212 includes a path that permits communication among the components of controller 210. Processor 214 may include any type of single-core processor, multi-core processor, microprocessor, latch-based processor, and/or processing logic (or families of processors, microprocessors, and/or processing logics) that interprets and executes instructions. In other embodiments, processor 214 may include an application-specific integrated circuit (ASIC), a field-programmable gate array (FPGA), and/or another type of integrated circuit or processing logic.

Memory 216 stores information, data, and/or instructions. Memory 216 may include any type of dynamic, volatile, and/or non-volatile storage device. Memory 216 may store instructions, for execution by processor 214, or information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radio frequency (RF), infrared, and/or visual optics, etc.), or a combination of wireless and wired communication links. Network interface 218 may include a transmitter that converts baseband signals to RF signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi) card for wireless communications. Network interface 218 may also include a universal serial bus (USB) port for communications over a cable, a Bluetooth wireless interface, a radio-frequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices 230 using a Serial Peripheral Interface Bus protocol (e.g., the Wiegand protocol, and/or the RS-485 protocol). As another example, peripheral interface 220 may use a different type of protocol. In one embodiment, network interface 218 may also act as a peripheral interface for coupling peripherals 230 to controller 210.

Housing 222 may enclose the components of controller 210 and may protect the components of controller 210 from the environment. In one embodiment, housing 222 may include one or more of peripheral devices 230. In another embodiment, housing 222 may include administration device 130. Housing 222 may define the boundaries of one system unit 115 and/or controller 210 from other system units 115 and/or controllers 210 in a system with more than one unit 115 or controller 110.

As described below, controller 210 may perform operations relating to distributing user credentials for one or more services on one or more devices. Controller 210 may perform these operations as a result of hardwired circuitry of an ASIC. Controller 210 may also (or alternatively) perform these operations in response to processor 214 executing software instructions contained in a computer-readable medium, such as memory 216. A computer-readable medium may include a non-transitory and/or tangible memory device. Memory 216 may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Returning to peripheral devices 230, reader device 240 may include a device that reads credentials from a user and provides the credentials to controller 210. For example, reader device 240 may include a keypad or keyboard configured to receive an alphanumeric personal identification number (PIN) from a user; a card reader configured to read a card that stores a code on a magnetic strip or another type of storage device, such as an RFID tag; a fingerprint reader configured to read a user's fingerprint; an iris reader configured to read a user's iris; a microphone and a voice signature identifier configured to record a user's voice signature; an NFC reader; a camera that is associated with facial recognition software; a microphone that is associated with voice recognition software; and/or another type of reader device. Reader device 240 may include any type security device that can provide credentials, and may include one or more sensor devices, such any sensor device described below with reference to sensor 260. For example, reader device 240 may include a camera used for facial recognition and/or a microphone used for voice recognition. In this case, the user's face or voice may be used as a credential.

Lock device 250 may include a lock controlled by controller 210. Lock device 250 may lock a door (e.g., prevent it from opening or closing), a window, an HVAC vent, and/or another type of access opening to a secure area. For example, lock device 250 may include an electromagnetic lock; a mechanical lock with a motor controlled by controller 210; an electromechanical lock; and/or another type of lock.

Sensor 260 may include a sensing device. As examples, sensor 260 may include a door sensor to sense whether a door is open or closed; a visible light monitoring device (e.g., a camera), an infrared (IR) light monitoring device, a heat signature monitoring device, an audio monitoring device (e.g., a microphone), and/or another type of monitoring device; an alarm sensor, such as a motion sensor, a heat sensor, a pressure sensor, and/or another type of alarm sensor; a tamper sensor, such as a position sensor located inside unit 115; and/or a "request to exit" button located within a secured area associated with unit 115; and/or another type of sensor device. In the examples below, sensor 260 may be referred to as "camera 260."

Actuator 270 may include an actuator device. As an example, actuator 270 may control an illumination device. As other examples, actuator 270 may include a burglar alarm activator; a speaker to play messages or generate alarm signals; a display device; a motor to move sensor 260 (e.g., control the field of view of a camera or other monitoring device); a motor for opening/closing a door, window, HVAC vent, and/or another opening associated with a secure area; a motor to secure lock device 250 in a locked or unlocked position; a fire extinguishing device; and/or another type of actuator device.

Although FIGS. 2A and 2B show exemplary components of unit 115, in other implementations, unit 115 may include fewer components, different components, additional components, or differently arranged components than depicted in FIGS. 2A and 2B. For example, although a single reader device 240, a single lock device 250, a single sensor 260, and a single actuator 270 are shown in FIG. 2A, in practice, peripheral devices 230 may include multiple reader devices 240, multiple lock devices 250, multiple sensors 260, and/or multiple actuators 270. Peripheral devices 230 may also not include one or more of the devices shown in FIG. 2A. Additionally or alternatively, any component of unit 115 (or any group of components) may perform the task or tasks described as performed by one or more other components of unit 115.

Further, although exemplary distributed control system 110 includes a physical access distributed control system, other implementations may control systems other than physical access. On the other hand, distributed control system 110 may include any type of physical access control systems (e.g., in an operational environment), such as a control system for opening and/or closing a door or controlling physical access to a building or facility. Distributed control system 110 may also include a system to control a fan (e.g., start or stop), to initiate an alarm in a building management system (e.g., failed authentication, successful authentication, etc.), or to control a robot arm in an industrial automation system.

Figure 3A:
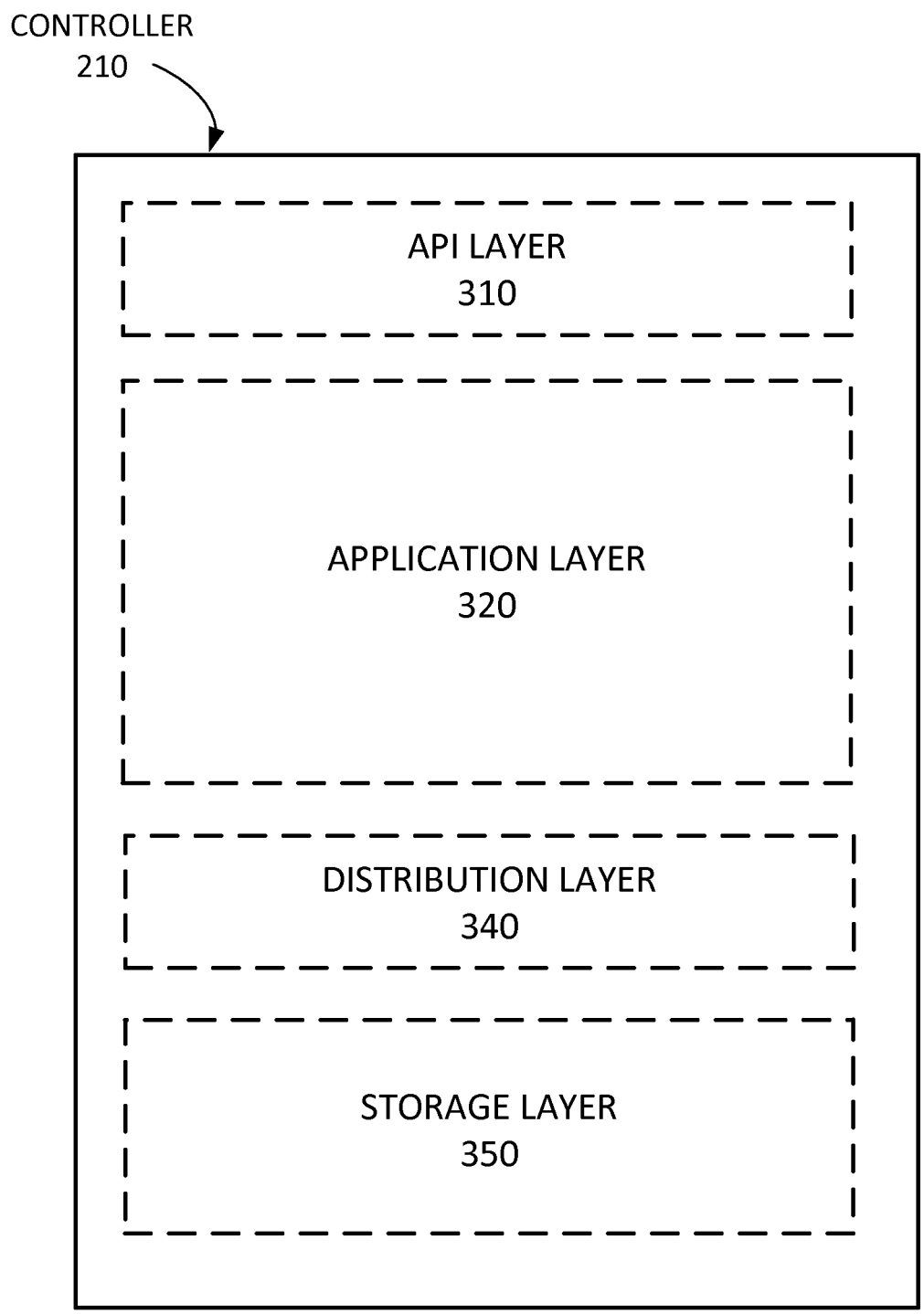
FIGS. 3A and 3B are block diagrams illustrating functional components of the system unit of FIG. 1 in one embodiment.

FIG. 3A is a block diagram illustrating exemplary functional layers of system unit 115. As shown in FIG. 3A, unit 115 may include an application program interface (API) layer 310, an application layer 320, a distribution layer 340, and a storage layer 350.

API layer 310 includes an API configured to communicate, e.g., with administration device 130. When an administrator uses administrator device 130 to log into unit 115, API layer 310 may communicate with administrator device 130 to authenticate the administrator. As another example, API layer 310 may communicate with administrator device 130 to change a configuration of unit 115. API layer 310 may receive data from administrator device 130 and provide the data to distribution layer 340 and/or to storage layer 350. API layer 310 may also communicate with administrator device 130 to install an application in application layer 320. API layer 310 may be configured to handle different administrator types. For example, API layer 310 may include an API to handle a Web Services administrator, a Linux administrator, an Open Network Video Interface Forum (ONVIF) administrator, and/or another type of API.

Application layer 320 may include one or more applications installed on unit 115. Applications may include a control logic application, a door control application to open and close doors, and a reader control application to receive user credentials, among other applications. Applications are discussed in more detail with respect to FIG. 3B.

Distribution layer 340 may manage one or more distributed datasets associated with units 115. For example, distribution layer 340 may connect controllers 210 in a peer-to-peer network for the distribution of datasets. Distribution layer 340 may use a protocol (e.g., a PAXOS protocol) to establish a consensus with respect to a change in a particular consensus-based distributed dataset. As an example, distribution layer 340 may send a proposal for a change to other system units 115 associated with the distributed dataset and may receive a quorum for the change from the other system units 115. As another example, distribution layer 340 may vote for a proposal received from another unit 115. As yet another example, distribution layer 340 may receive an indication that a consensus has been reached for a change without having voted for the change. When an indication of consensus for a change is received, distribution layer 340 may make the change in the local copy of the distributed dataset. Distribution layer 340 may maintain secure connections with other units 115 over network 120. (e.g., a Transport Layer Security (TLS) connection).

Storage layer 350 may store one or more datasets associated with unit 115. A dataset stored in storage layer 350 may correspond to a local dataset or may correspond to a distributed dataset. A local dataset may store information associated with (and/or only associated with) the particular unit 115 that stores the local dataset. A distributed dataset may store information that is distributed among other system units 115 associated with the distributed dataset.

Figure 3B:
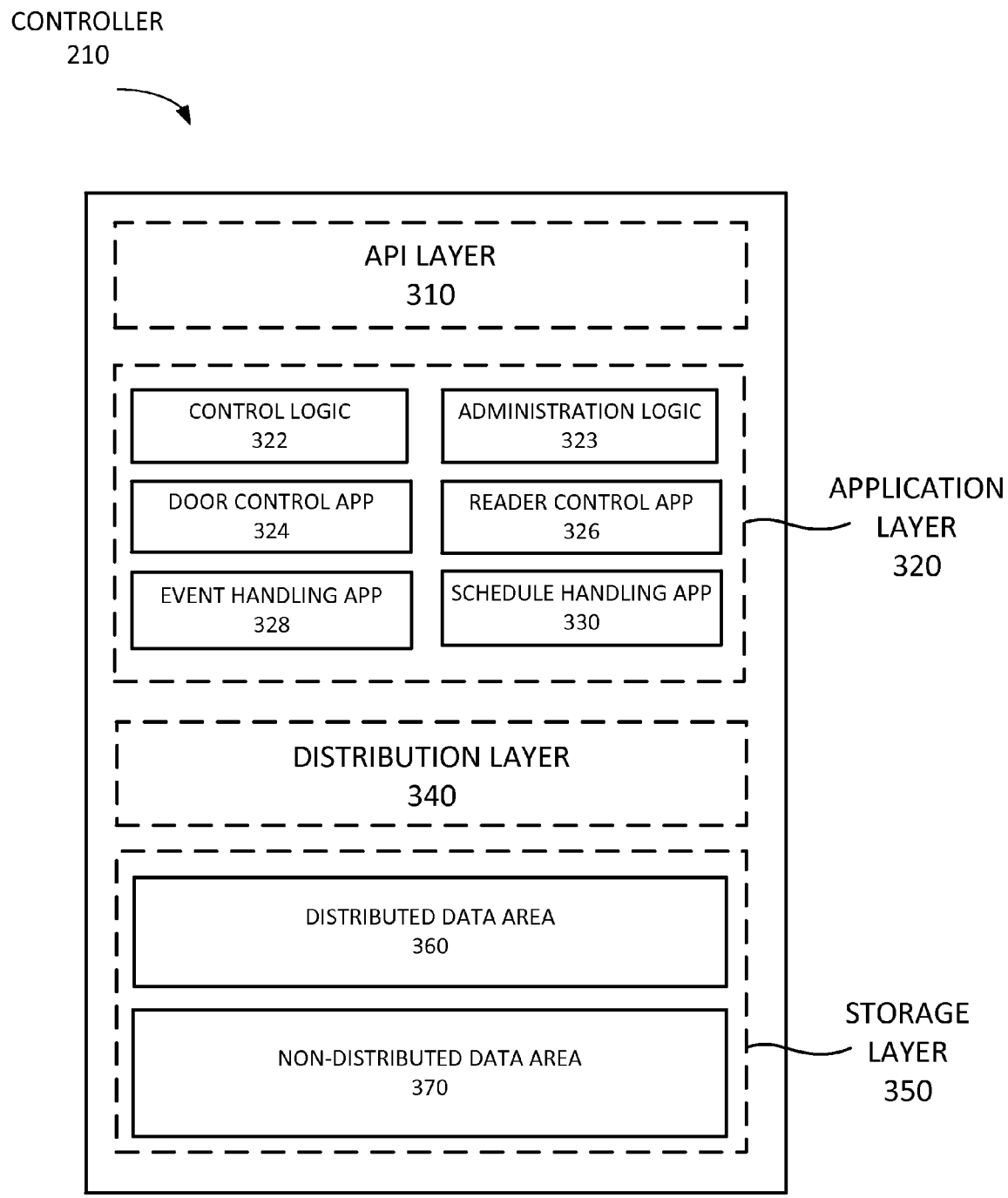

FIG. 3B is a block diagram of exemplary functional components of controller 210, with more detail provided for application layer 320 and storage layer 350. As shown in FIG. 3B, application layer 320 may include a control logic application 322 (or "control logic 322"), administrator authentication logic 323, a door control application 324, a reader control application 326, an event handling application 328, and/or a schedule handling application 330. Other applications may include, for example, alarm and control applications.

Control logic 322 may determine whether to grant physical access to a user based on received credentials and based on stored access rules. Administration logic 323 may grant access (e.g., remote access such as a remote login) to an administrator and provide other administration processes. As such, administration logic 323 may authenticate an administrator based on credentials (e.g., a username and password), and authorize the administrator to access and update user credentials (e.g., for other administrators and/or for users who wish to be granted physical access), etc.

Door control application 324 may control one or more doors and/or associated lock devices 250. For example, door control application 324 may determine whether a door is open or closed and/or locked or unlocked and may operate one or more device to open or close the door and/or to lock or unlock the door. Reader control application 326 may control one or more reader devices 240 and may obtain and process credentials received from the one or more reader devices 240. Event handling application 328 may process events recorded by unit 115, such as door opening events, alarm events, sensor events, and/or other types of logged events. Event handling application 328 may generate a report and/or an alarm and send the report and/or alarm to administrator device 130 (and/or to another designated device, such as other units 115). Schedule handling application 330 may manage one or more schedules associated with unit 115. For example, access rules for particular groups of users may change based on particular times of day.

Storage layer 350 may include a distributed data area 360 and a non-distributed data area 370. In one embodiment, distributed data area 360 may include distributed consensus-based data (e.g., database) and/or distributed non-consensus-based data (e.g., database). Non-distributed data area 370 may include data (e.g., database) that is not distributed and/or is not consensus-based (i.e., such as the local dataset described above). A "data area" may refer to a database and/or a memory area, for example.

Figure 3C:
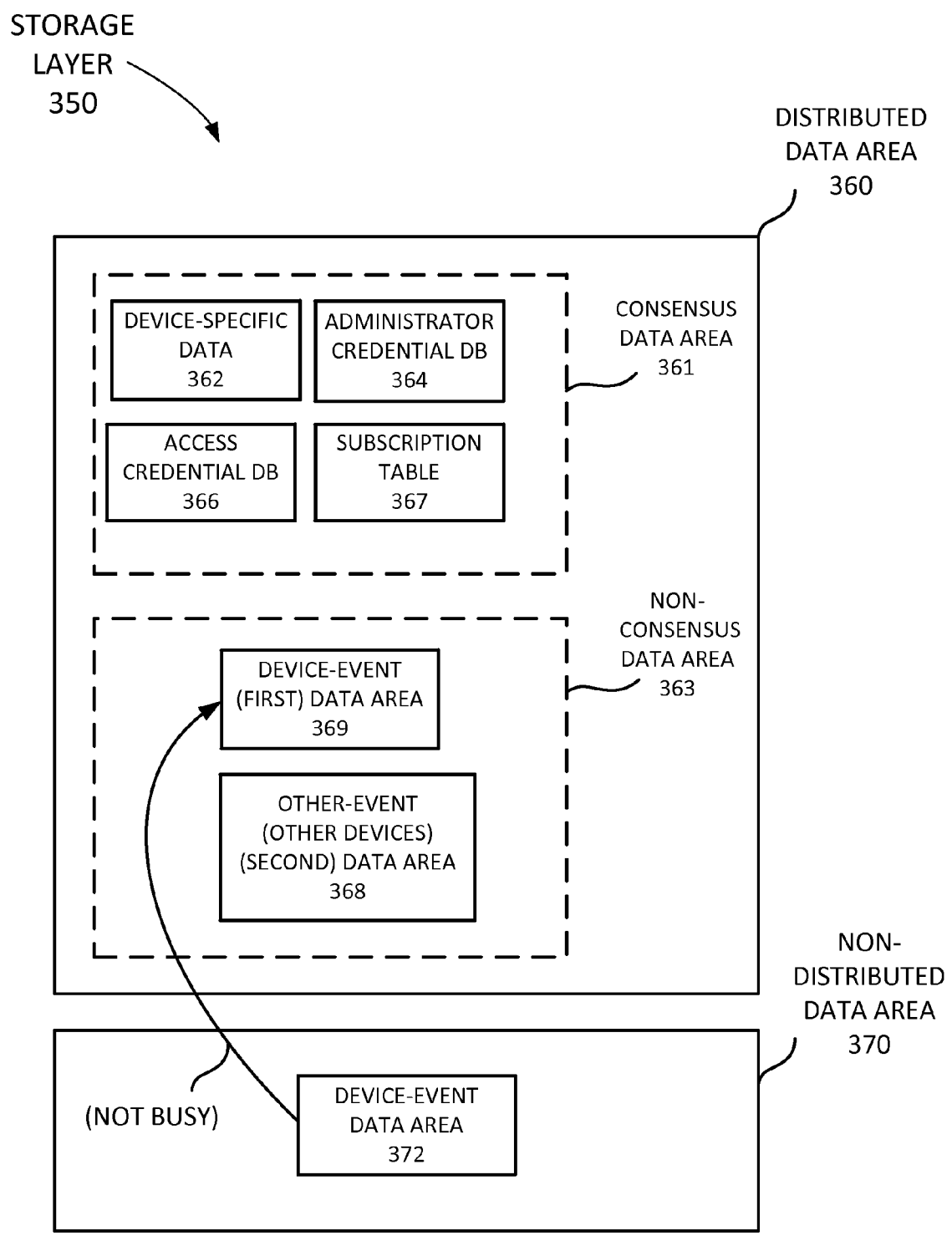
FIGS. 3C and 3D are block diagrams illustrating functional components of the storage layer of FIG. 3B in one embodiment.

FIG. 3C is a block diagram of exemplary components of storage layer 350. As shown, distributed data area 360 may include consensus data area 361 and non-consensus data area 363. Consensus data area 361 includes data, as described above, which may require a consensus among peers before a change to data is accepted. Non-consensus data area 363 includes data, as described above, which may not require consensus among peers before a change to the data is accepted. In one embodiment, non-consensus data may include events that occur at a unit 115. In this case, the corresponding unit 115 may "own" the event and consensus may not be needed to avoid a "split-brain syndrome." Split-brain syndrome may occur, for example, when different units distributing a distributed database store inconsistent or conflicting data and a consensus cannot be reached to resolve the inconsistency or the conflict.

As shown in FIG. 3C, consensus data area 361 may include device-specific data 362, administrator credential DB 364, access credential DB 366, and/or subscription table 367. As discussed above, device-specific data 362 may include configuration information associated with a particular unit 115, such as hardware configuration of controller 210, peripheral devices 230 connected to controller 210, applications installed in application layer 320, or other types of information.

Administrator credential DB 364 may store the credentials (e.g., usernames and passwords) for authenticating users that can administer and/or manage system unit 115 (e.g., with a remote login). In one embodiment, administrator credential DB 364 is distributed among other controllers 210 (e.g., in a consensus-based database) to allow the same administrators to administer system 110 from any of the controllers 210 or units 115.

Access credential DB 366 may store the credentials for users wishing to access a physical area (e.g., card and pin information, fingerprint information, etc.). In one embodiment, data in access credential DB 366 may be distributed (e.g., in a consensus-based distributed database) to other controllers in a network.

Subscription table 367 may include a list of events and devices that have registered to subscribe to an event at another device. For example, a controller 210 for a spotlight may register and subscribe to a motion-detection event of a controller 210 for a camera. Thus, based on a set of rules, the spotlight may turn on (e.g., an "alarm" as discussed above) when motion is detected by the camera. Subscription table 367 is described in more detail below with respect to FIG. 3E.

As shown in FIG. 3C, non-consensus data area 363 stores device-event data area 369 (referred to as "device-event area 369" or "first data area") and other-event data area 368 (referred to as "other-event area 368" or "second data area"). Device-event area 369 stores (or logs) event data that originates from (or occurs at) that particular unit 115 and/or controller 110 (e.g., unit 115-A stores data in its own area 369 about an event occurring at unit 115-A having controller 110-A). Other-event area 368 stores (or logs) event data that originates from (or occurs at) other units 115 and/or controllers 110 (e.g., unit 115-A stores data in its own area 368 about an event occurring at any of units 115-B through 115-F). As mentioned above, events recorded in device-event area 369 and other-event area 368 may be tagged or associated with the corresponding device (e.g., a unique device identifier) and consensus may not be required to avoid split-brain syndrome.

In one embodiment, device-event area 369 and/or other-event area 368 (and other data areas in storage layer 350) may be associated with (or allocated) a maximum memory space. That is, device-event area 369 (first data area) is configured to occupy at most a first memory space and other-event area 368 (second data area) is configured to occupy at most a second memory space. In one implementation, the maximum memory space allocated for device-event area 369 (the first memory space) is larger than the maximum memory space allocated for other-event area 368 (the second memory space). Further, in one embodiment, areas 368 and 369 may be text files in which each line of the text file corresponds to a different event, for example. In one embodiment, other data areas in storage layer 350 may also be associated with (or allocated) a maximum memory space (e.g., device-event data area 372).

Non-distributed data area 370 may also store event data that originates from the particular unit 115 and/or controller 110 (e.g., unit 115-A stores data in area 370 about an event occurring at unit 115-A and/or controller 110-A). Data stored in device-event data area 372, like data areas 368 and 369, may be tagged or associated with the corresponding device (e.g., a unique device identifier) and consensus may not be required to avoid split-brain syndrome. In one embodiment, as illustrated in FIG. 3C with an arrow, data from device-event area 372 may be copied from non-distributed data area 370 to non-consensus data area 363.

Accordingly, FIG. 3C shows a memory (e.g., storage layer 350) including a first data area (device-event area 369) to store event data originating at the corresponding device (controller 210) and a second data area (other-event area 368) to store event data originating from other devices (other controllers 210) of the plurality of devices. Further, as discussed, in one embodiment, the first data area may be configured to occupy at most a first memory space and the second data area may be configured to occupy at most a second memory space.

Figure 3D:
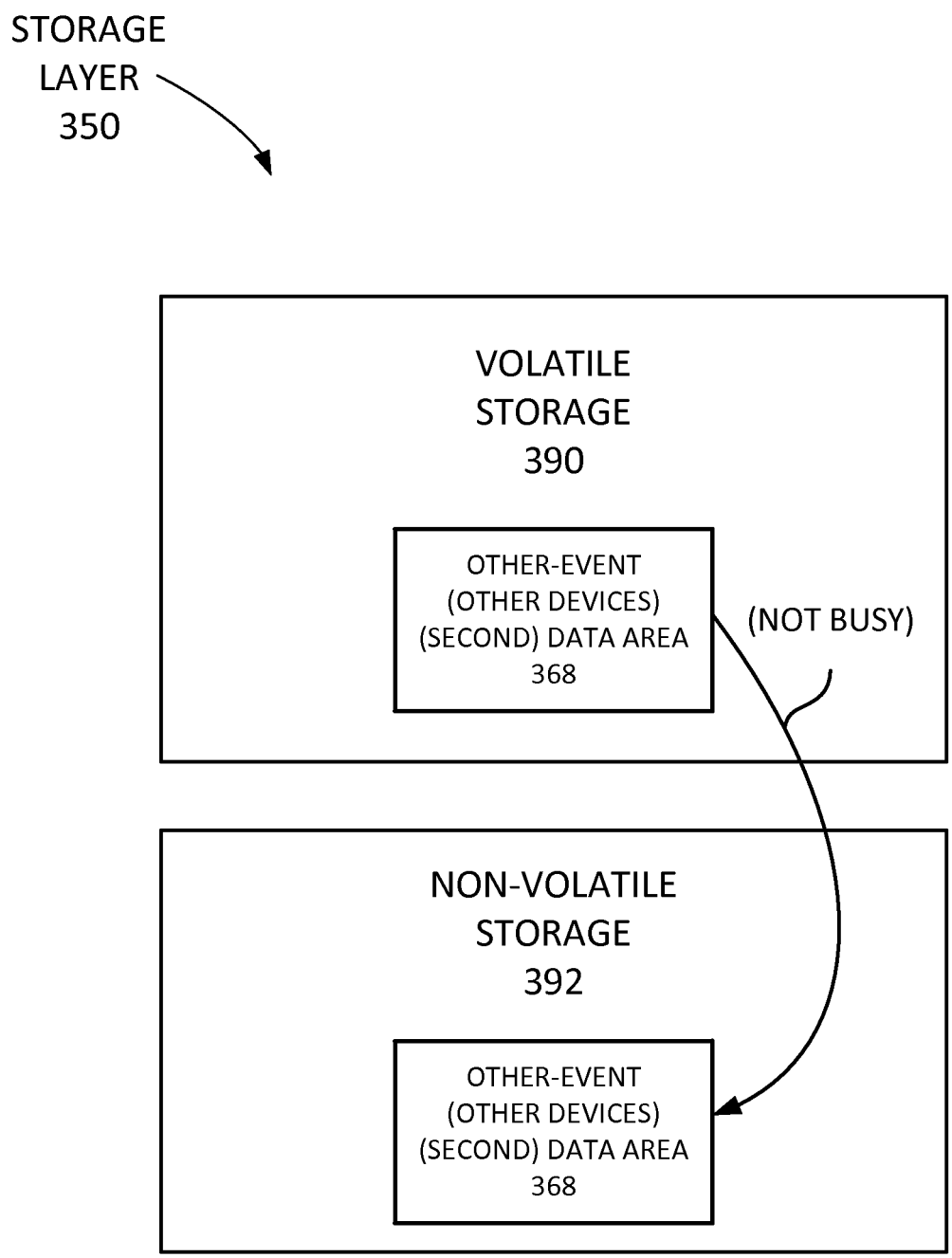

FIG. 3D is another block diagram of exemplary components of storage layer 350. As shown, storage layer 350 may include a volatile storage 390 and a non-volatile storage 392. Volatile storage 390 stores data as long as it is supplied with power. That is, as soon as volatile storage 390 loses power, its data is erased. Non-volatile storage 392, on the other hand will store data even without power, although non-volatile storage 392 may require power to change the data stored. In one embodiment, the time it takes to change data stored (or to store data) in volatile storage 390 is shorter (e.g., significantly shorter) than the time it takes to change data stored (or to store data) in non-volatile storage 392. Likewise, the computational power it takes to change data stored (or to store data) in volatile storage 390 may be less (e.g., significantly less) than the computational power it takes to change data stored (or to store data) in non-volatile storage 392. The different data areas shown in FIG. 3C (e.g., device-event data area 369, other-event data area 368, distributed data area 360, and/or non-distributed data area 370) may have an area in both volatile storage area 390 and non-volatile storage area 392.

Although FIGS. 3A-3D show exemplary functional components of unit 115, in other implementations, unit 115 may include fewer functional components, different functional components, differently arranged functional components, or additional functional components than depicted in FIGS. 3A-3C. Additionally, any one of the components (or any group of components) of unit 115 may perform functions described as performed by one or more other functional components of unit 115. Further, the functional components of unit 115 may be implemented, for example, via hard-wired circuitry of one or more ASICs. Additionally or alternatively, the functional components of unit 115 may be implemented by processor 214 executing instructions from memory 216.

Figure 3E:
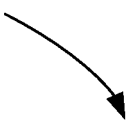
FIG. 3E is a block diagram of an exemplary subscription table in one embodiment.

FIG. 3E is a block diagram of an exemplary subscription table 367. Subscription table 367 may include a subscriber field 392, a device field 394, and/or an event field 396. subscription table 367 may include more, fewer, or a different arrangement of fields than shown in FIG. 3E.

Subscriber field 392 identifies a controller 210 that has registered to subscribe to an event at a device. Event field 396 identifies the event to which the corresponding controller 210 in subscriber field 392 has subscribed. Device field 394 identifies controller 210 with which the corresponding event is associated. For example, as shown in the first row of subscription table 367, controller 210-C has subscribed to receive data about events from controller 210-A involving motion detected by camera 260. Thus, based on a set of rules, when controller 210-C receives data about motion being detected by camera 260, controller 210-C may activate its actuator to turn its spotlight toward the detected motion.

In one embodiment, subscription table 367 may be configured manually by an administrator. In another embodiment, the administrator may configure the rules for a controller (e.g., move spotlight toward motion detected by camera 260) and system 110 will automatically subscribe controller 210-C to the proper event in controller 210-A.

Figure 4:
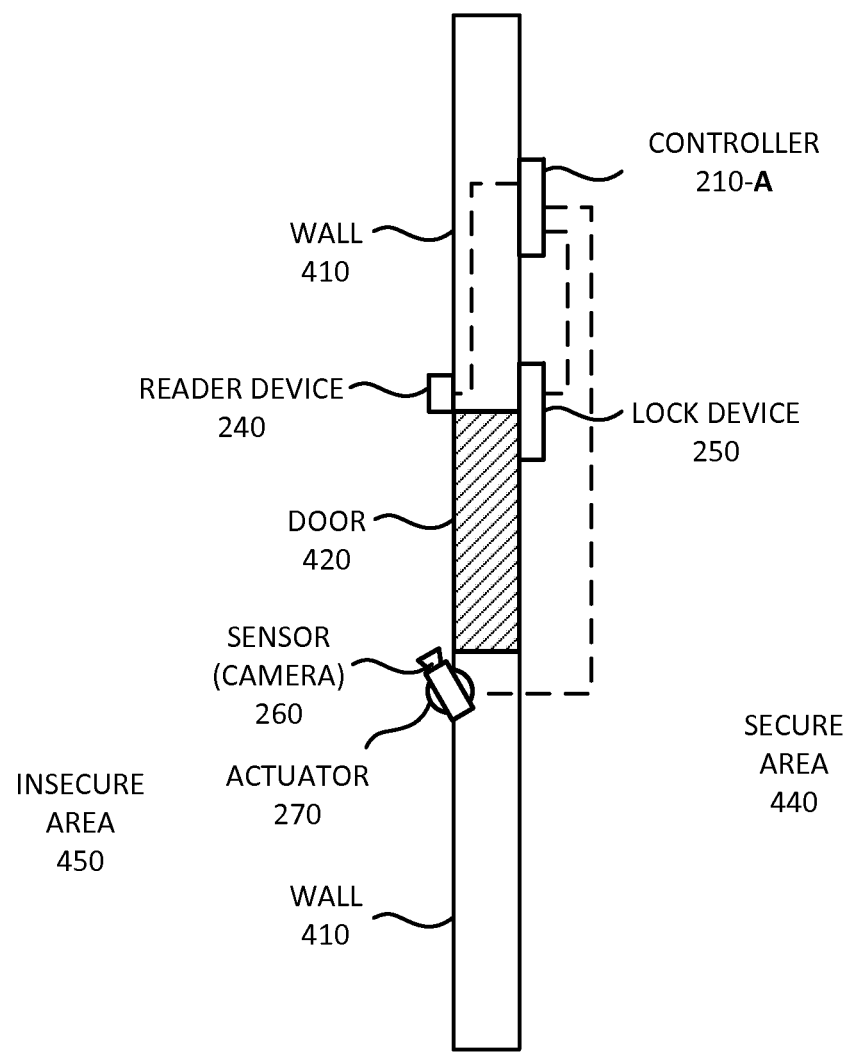
FIG. 4 is a floor plan diagram illustrating an exemplary physical layout of a system unit of FIG. 1.

FIG. 4 is a floor plan diagram illustrating an exemplary physical layout of unit 115-A. As shown in FIG. 4, unit 115-A may include a wall 410, a door 420, controller 210-A, reader device 240, lock device 250, sensor 260, and actuator 270.

Wall 410 encloses a secure area 440, such as a room in a building. Door 420 provides access for a user to secure area 440. In this embodiment, controller 210-A is installed inside secure area 440. In other embodiments, controller 210-A may be installed in an insecure area 450. Reader device 240 is installed outside secure area 440 and lock device 250 is installed inside secure area 440 to wall 410 and door 420. Sensor 260, in this example, is a monitoring device mounted outside secure area 440 in insecure area 450. Actuator 270 includes a motor used to control the field of view of the monitoring device in this example.

When a user enters credentials into reader device 240 (e.g., by entering a PIN, scanning an access card, scanning an iris, etc.), controller 210-A may use the credentials to authenticate the identity of the user and may perform a lookup in an access rules table to determine whether to grant access to the user based on the identity of the user and the access rules. If controller 210-A determines that access should be granted, controller 210-A activates lock device 250 to unlock door 420, thus granting access to the user to secure area 440.

Although FIG. 4 shows exemplary components of physical layout 400, in other implementations, physical layout 400 may include fewer components, different components, additional components, or differently arranged components than depicted in FIG. 4. Additionally or alternatively, any one component (or group of components) in physical layout 400 may perform a task or tasks described as performed by one or more other components of physical layout 400.

Figure 5:
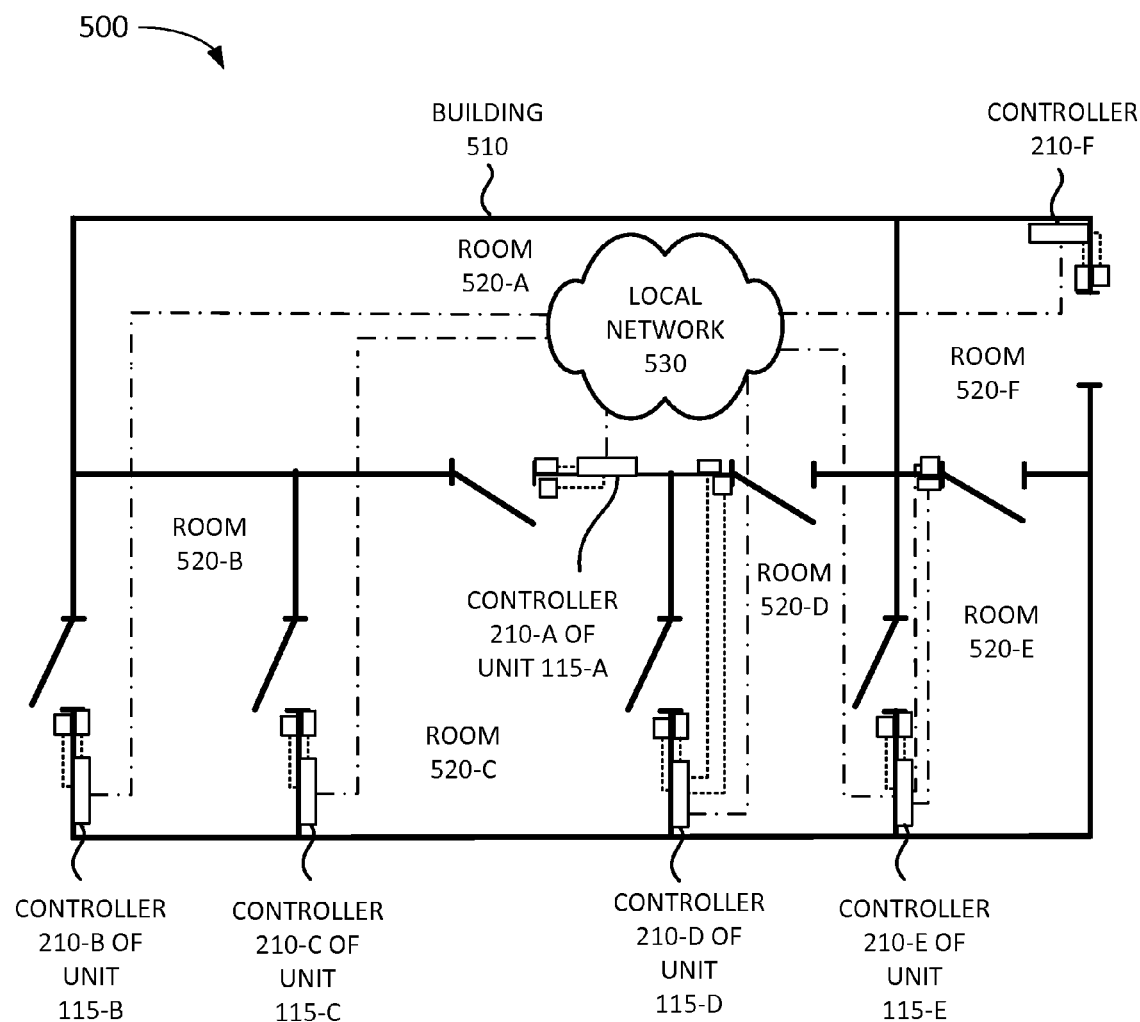
FIG. 5 is a floor plan diagram illustrating an exemplary physical layout of the control system of FIG. 1.

FIG. 5 is a floor plan diagram illustrating an exemplary physical layout 500 of control system 110. As shown in FIG. 5, physical layout 500 includes unit 115-A (shown in FIG. 4). Physical layout 500 may also include a building 510 with rooms 520-A through 520-F. A local network 530, such as an Ethernet network, may interconnect system units 115-A through 115-F. In this example, system unit 115-A controls two doors into room 520-A; system unit 115-B controls an outside door into room 520-B; system unit 115-C controls one door from room 520-B to room 520-C; system unit 115-D controls one door from room 520-C to room 520-D; system unit 115-E controls one door from room 520-D to room 520-E; and unit 115-F controls an outside door into room 520-F.

In this example, system units 115-A to 115-F do not include a central controlling device (e.g., a server) and may include one or more distributed datasets. For example, system units 115-A through 115-F may maintain a distributed credentials table, a distributed access rules table, and/or a distributed events log. Assume an administrator uses administration device 130 to log into system unit 115-A to add a user and to add credentials associated with a user. Those added credentials may be distributed to the other system units 115 that control doors to rooms to which the user has access. If system unit 115-B fails, for example, data collected by system unit 115-B may continue to be available as a result of a distributed events log included in the other system units.

In FIG. 5, each unit 115 is associated with a controller 210. Further, in the implementation of FIG. 5, each controller 210 is in a different location (e.g., different room 520) than other controllers 210. In other implementations, some controllers 210 and units 115 may be located in different buildings, different geographic regions, different nations, different continents, etc., than other controllers and units 115. Despite their diverse locations, in one embodiment, units 115 and controllers 210 may be able to discover each other (or make a best effort to do so), form a peer-to-peer network, and distribute datasets.

Although FIG. 5 shows exemplary components of physical layout 500, in other implementations, physical layout 500 may include fewer components, different components, additional components, or differently arranged components than depicted in FIG. 5. For example, in another embodiment, a central controlling device (e.g., a server) may be used in conjunction with one or more distributed datasets. Additionally or alternatively, one or more components of physical layout 500 may perform one or more tasks described as performed by one or more other components of physical layout 500.

Figure 6:
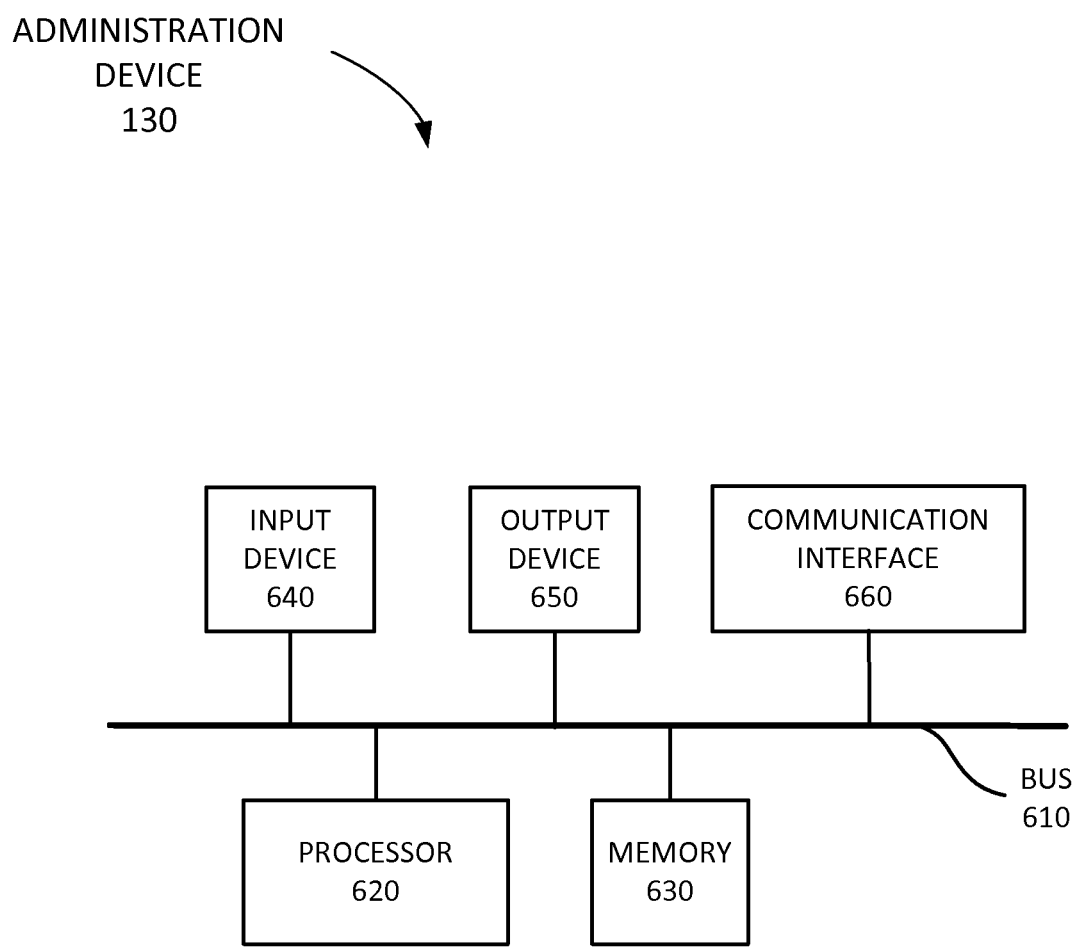
FIG. 6 is a block diagram of exemplary components of the administrative device of FIG. 1.

FIG. 6 is a block diagram illustrating exemplary components of administration device 130. As shown in FIG. 6, administration device 130 may include a bus 610, a processor 620, a memory 630, an input device 640, an output device 650, and a communication interface 660.

Bus 610 includes path that permits communication among the components of administration device 130. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an ASIC, an FPGA, and/or another type of integrated circuit or processing logic.

Memory 630 stores information, data, and/or instructions. Memory 630 may include a dynamic, volatile, and/or non-volatile storage device. Memory 630 may store instructions, for execution by processor 620, or information for use by processor 620. For example, memory 620 may include a RAM, a ROM, a CAM, a magnetic and/or optical recording memory device, etc.

Input device 640 allows an operator to input information into administration device 130. Input device 640 may include, for example, a keyboard, a mouse, a pen, a microphone, a touch-screen display, etc. Output device 650 may output information to an operator of administration device 130. Output device 650 may include a display, a printer, a speaker, and/or another type of output device.

Communication interface 660 may include (e.g., a transmitter and/or a receiver) that enables controller 210 to communicate (e.g., transmit and/or receive data) with other devices and/or systems via wired communication links, wireless communication links, or a combination of wireless and wired communication links. Communication interface 660 may include a network interface card (e.g., Ethernet card) for wired communications and/or a wireless network interface (e.g., a WiFi) card for wireless communications.

Administration device 130 may perform operations relating to managing units 115 in system 110. Administration device 130 may perform these operations in response to processor 620 executing software instructions contained in a computer-readable medium, such as memory 630. The software instructions contained in memory 630 may cause processor 620 to perform these operations.

Figure 7:
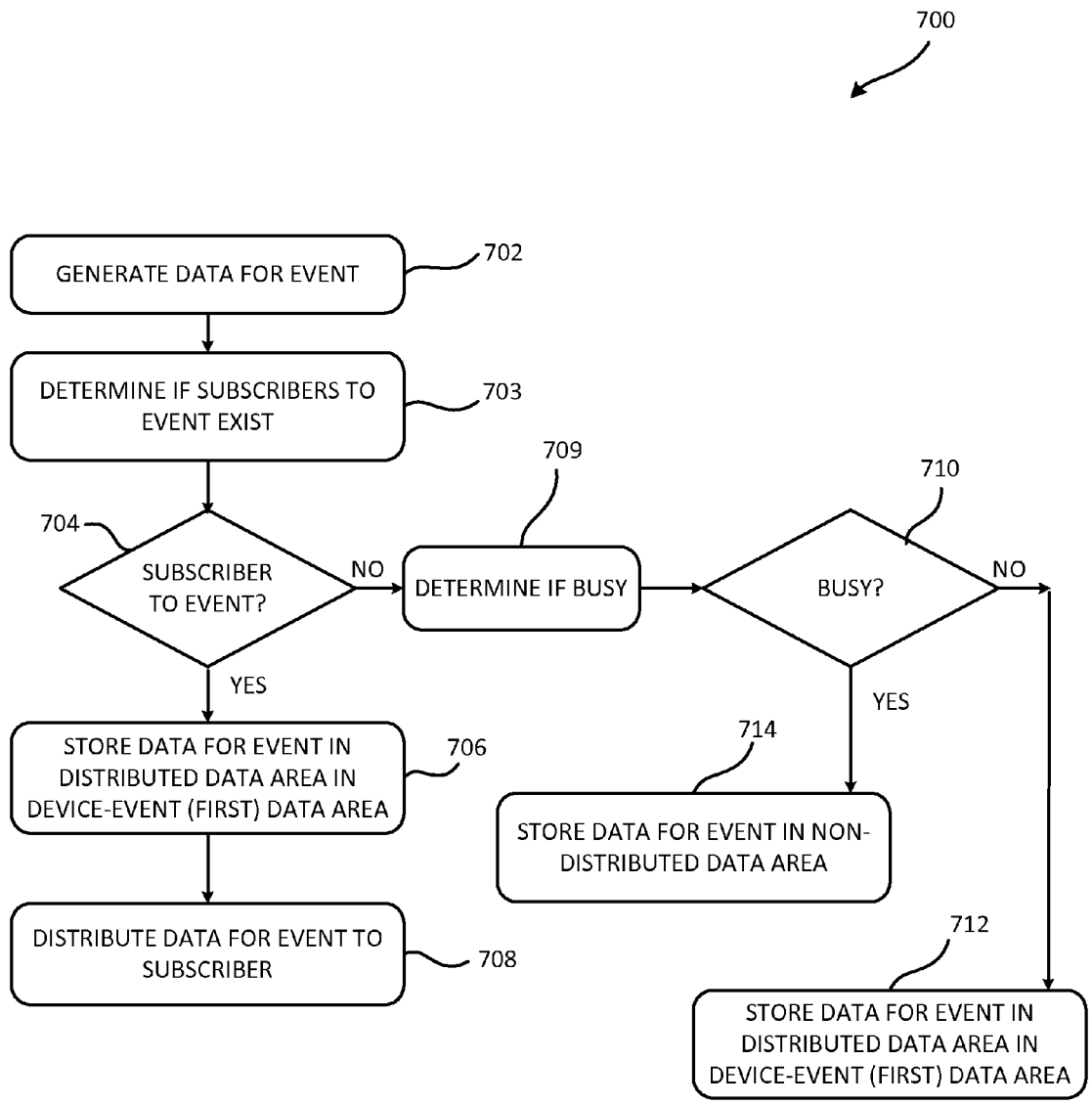
FIG. 7 is a flowchart of an exemplary process for distributing data of events in a distributed control system in one embodiment.

As mentioned above, controllers 210 store the event data in a distributed manner FIG. 7 is a flowchart of an exemplary process 700 for distributing data of events in a distributed control system in one embodiment. Process 700 may be performed by control logic 322, distribution layer logic 340, and/or event handling application 328 running in controller 210, for example.

Process 700 starts with the generation of an event (block 702). For example, camera 260 in unit 115-A may detect motion of an object within its view. This event may be reported from camera 260 to controller 210-A, whereby controller 210-A receives data about the event from camera 260. The data for the event may include information such as the fact that motion was detected, the time motion was detected, the magnitude of the motion, etc. Controller 210-A determines if a subscriber exists for the event (block 703). In this example, controller 210-A may query subscription table 367, which informs controller 210-A (listed in column 394) that controller 210-C registered to subscribe to the event "motion on camera 260." If there is a subscriber to the event (block 704: YES), then the data for the event may be stored in distributed data area 360 (block 706) (e.g., in device-event area 369 of non-consensus data area 363). Continuing with this example, controller 210-A stores the data describing the event "motion on camera 260" in device-event area 369 (first data area). The data for the event may also be tagged with the identity of the controller 210-A and/or camera 260.

As part of distributed data area 360, the data for the event may be distributed (block 708) to other controllers 210 (e.g., controllers 210-B through 210-F, including the subscribing controller 210-C) (block 708). Distribution may be handled by control logic 322 and/or distribution layer 340 as described above. Because the data about the event (e.g., motion on camera 260) is saved in device-event area 369 (first data area) in controller 210-A, controller 210-C becomes informed of the data of the event as part of the distribution of data in non-consensus data area 363 of distributed data area 360. Once controller 210-C receives the data about the event, controller 210-C may compare the data about the event to the rules and act on the event according to the appropriate rule based on the comparison. As such, controller 210-A may prioritize distribution of event data (e.g., stored in device-event area 369 or first data area) to another controller 210 (e.g., controller 210-C) when the other controller (e.g., controller 210-C) is associated with a subscription to the event data.

In the embodiment described above, controller 210-A may store the data for the event in device-event area 369 (first data area) (block 706) and distribute the data to other controllers 210 (block 708) regardless of whether controller 210-A is busy or not. In another embodiment, if the controller 210-A is busy then the data corresponding to the event may be distributed directly to subscribing controller 210-C without (or in addition to) being stored in device-event area 369 (first data area) of distributed data area 360 of controller 210-A. In this case, controller 210-A (e.g., network interface 218) may transmit a message directly to controller 210-C with the data of the event. This embodiment may reduce computational resources (e.g., of controller 210-A) and network resources (e.g., of network 120) for distribution of the data of the event until a less busy time period. In another embodiment, controller 210-A may only transmit data regarding events to other controllers 210 that have subscribed to the event. This embodiment may conserve resources of controller 210-A. Controller 210-A may determine that it is busy based on a state or a trigger event: e.g., based on processor load threshold, the amount of traffic in network 120 (e.g., dropping below a threshold or being above a threshold), the number of events it is processing (e.g., above or below a threshold), etc. Controller 210-A may be busy because, for example, it is generating and processing a full load of events (e.g., entries into the door controlled by lock device 250).

If there are no subscribers to the event (block 704: NO), then controller 210-A may determine if it is busy (block 709). A determination of whether controller 210 is busy or not is described above. If controller 210-A is not busy (block 710: NO), then the data for the event may be stored in distributed data area 360 (block 712) (e.g., in device-event area 369 (first data area) of non-consensus data area 363). In this example, as part of distributed data area 360, the data for the event is distributed (block 712) to other controllers 210 (e.g., controllers 210-B through 210-F). In another embodiment, controller 210-A may determine if the other controllers 210 are busy or not (not shown in FIG. 7). In this embodiment, if another controller 210 is busy, then controller 210-A may wait until the other controller (e.g., controller 210-C) is not busy before distributing the data to that other controller 210. As described below with respect to FIG. 10, controller 210-A may determine that another controller 210-C is busy if controller 210-A has received a "hold message" from the other controller 210-C indicating it is busy. As also described below with respect to FIG. 10, controller 210-A may determine that another controller 210-C is not busy if controller 210-A has received a "stop-hold message" from the other controller 210-C indicating that it is not (or no longer) busy. In another embodiment, controller 210-A may determine that another controller 210-C is busy if the event data being transmitted by and received from the other controller 210-C is above a threshold (e.g., a threshold determined by a historical analysis of event data from controller 210-C).

If controller 210-A is busy (block 710: YES), then the data for the event can be stored in non-distributed data area 370 (e.g., device-event area 372) (block 714). As discussed above, data stored in non-distributed data area 370 is not subject to distribution by distribution layer 340 and this may save resources—since controller 210 is busy. As discussed in more detail below with respect to FIG. 10, the data for the event may be moved or copied from non-distributed data area 370 to distributed data area 360 (e.g., device-event area 369) for distribution when controller 210 is less busy, for example. Further, in one embodiment, if controller 210-A is busy (block 710: YES), then the data for the event can be stored in volatile storage 390 rather than non-volatile storage 392. As discussed above, controller 210-A may save resources by saving the data to volatile storage 390 rather than non-volatile storage—since controller 210 is busy. The data for the event may be moved or copied from volatile storage 390 to non-volatile storage 392 when controller 210 is less busy, for example.

If controller 210-A loses power (e.g., a power failure) and distributed data (e.g., in distributed data area 360) in volatile storage 390 is lost, the distributed data may be rebuilt from other devices (e.g., controllers 210-B through 210-F) when power is restored. Thus, in this embodiment, controller 210-A may conserve resources (e.g., by not copying data to non-volatile storage 390) while not jeopardizing data. Thus, in another embodiment, if the data for the event is stored in non-distributed data area 370 (e.g., device-event area 372) (block 714), then the event data may be stored in non-volatile storage 392 even when controller 210-A is busy (block 710: YES). In this embodiment, if controller 210-A loses power and the event data has not been distributed to other devices (e.g., because the data has not been stored or copied to device-event area 369), the event data may be recovered from non-volatile storage 392.

Figure 8:
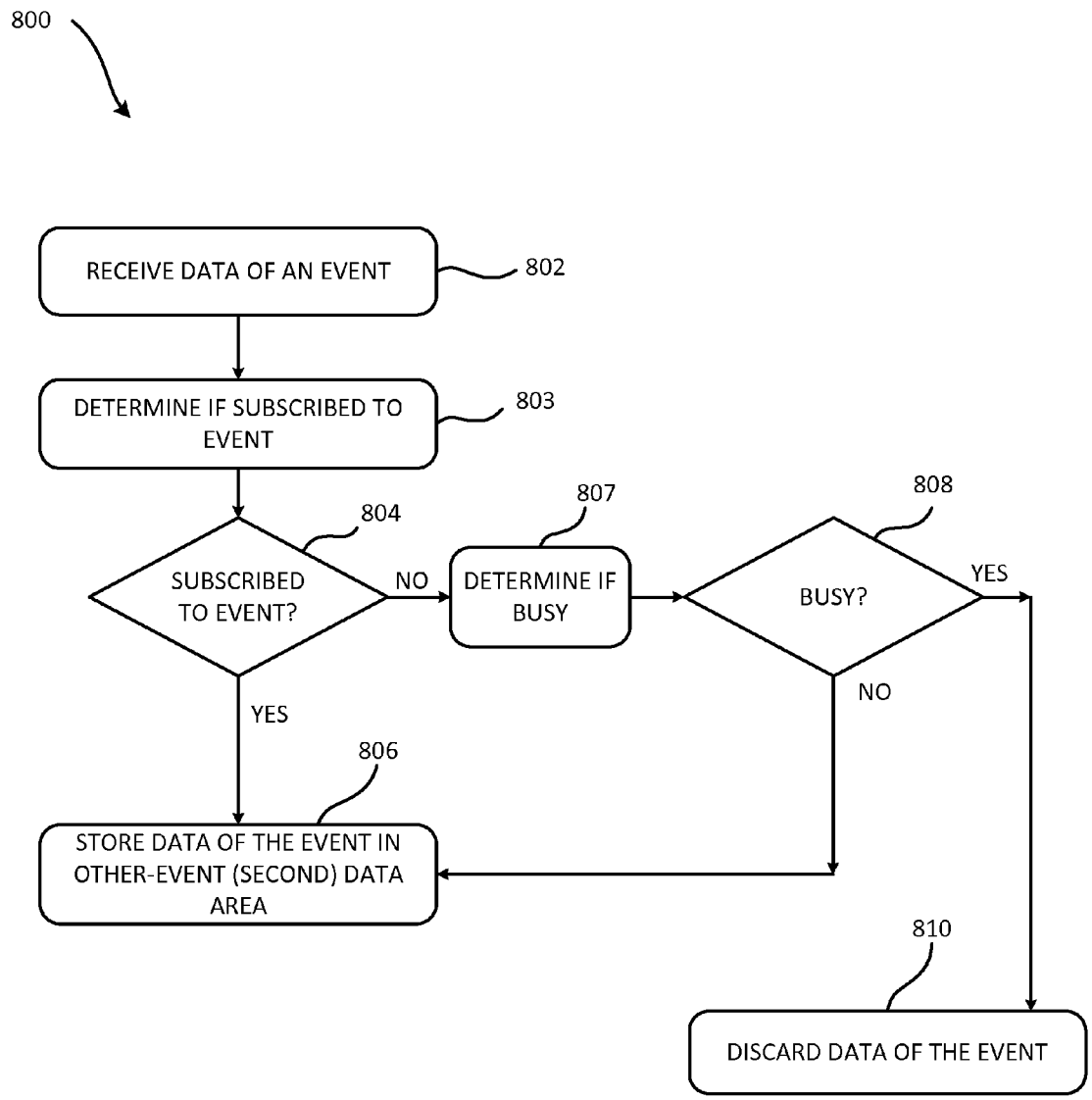
FIG. 8 is a flowchart of an exemplary process for receiving data of events in a distributed control system in one embodiment.

Not only can controller 210-A generate and send data of events, it can receive data of events (e.g., through its network interface 218 from other controllers 210-B through 210-F). FIG. 8 is a flowchart of an exemplary process 800 for receiving data of events in a distributed control system in one embodiment. Process 800 may be performed by control logic 322, distribution layer logic 340, and/or event handling application 328 running in controller 210, for example.

Process 800 begins with the receipt of data regarding an event (block 802) (e.g., from another unit 115). For example, controller 210-A may receive data of an event from controller 210-D that indicates that the reader associated with controller 210-D received a valid entry code. Controller 210-A determines if it is subscribed to such an event (block 803). Controller 210-A may query subscription table 367 to determine if it is subscribed to such an event. As indicated in subscription table 367 (third row), controller 210-A is subscribed to "valid entry code received from user via reader" for controller 210-D. In another embodiment, controller 210-A may only receive data regarding events to which it is subscribed. Likewise, other controllers 210 may only transmit data regarding events to other controllers 210 that have subscribed to the event. In this case, controller 210-A may not have to determine if it is subscribed to the event associated with the received data (block 803). This embodiment may conserve resources of controller 210-A.

If controller 210-A is subscribed to such an event (block 804: YES), controller 210-A may store the data of the event (block 806) in, for example, other-event area 368 of non-consensus data area 363. If controller 210-A is not subscribed to the event (block 704: NO), controller 210-A may nonetheless still receive and store the data of the event. In one embodiment, controllers 210 (e.g., all controllers 210 in one implementation) may eventually receive and store all events in control system 110. If the controller 210 is already busy, however, receiving and distributing low priority events could overload the controller and degrade performance. Thus, in one embodiment, controller 210-A determines if it is busy (block 807). A determination of whether controller 210 is busy or not is described above with respect to FIG. 7.

If controller 210-A is not busy (block 808: NO), then controller 210 may store the data of the event (block 806) in, for example, other-event area 368 (second data area) of non-consensus data area 363. Events to which a controller 210 has subscribed may have higher priority and hence the corresponding event data may be dealt with when the controller 210 receives the event data—even when the controller 210 is busy. If controller 210-A is busy (block 808: YES), then controller 210 may discard the data of the event (block 810) rather than store it (e.g., rather than keeping it in storage, such as in volatile storage 390). Nonetheless controller 210-A may discard the data because storing the data to non-volatile storage 392 may be too burdensome while busy. In one embodiment, (discussed below with respect to FIG. 10), controller 210-A may request the data of missed events (included the discarded data from block 810) when it is less busy. In yet another embodiment, the event data may be resent by the other controllers 210 to controller 210-A (or all controllers 210) when controller 210-A is less busy. The other controllers 210 may determine that controller 210-A is less busy by, for example, monitoring the event data activity generated by controller 210-A. Accordingly, the event data which controller 210 discards (block 810) or otherwise does not receive may eventually be requested by (or resent to) controller 210-A to help complete the event data in controller 210-A.

Figure 9:
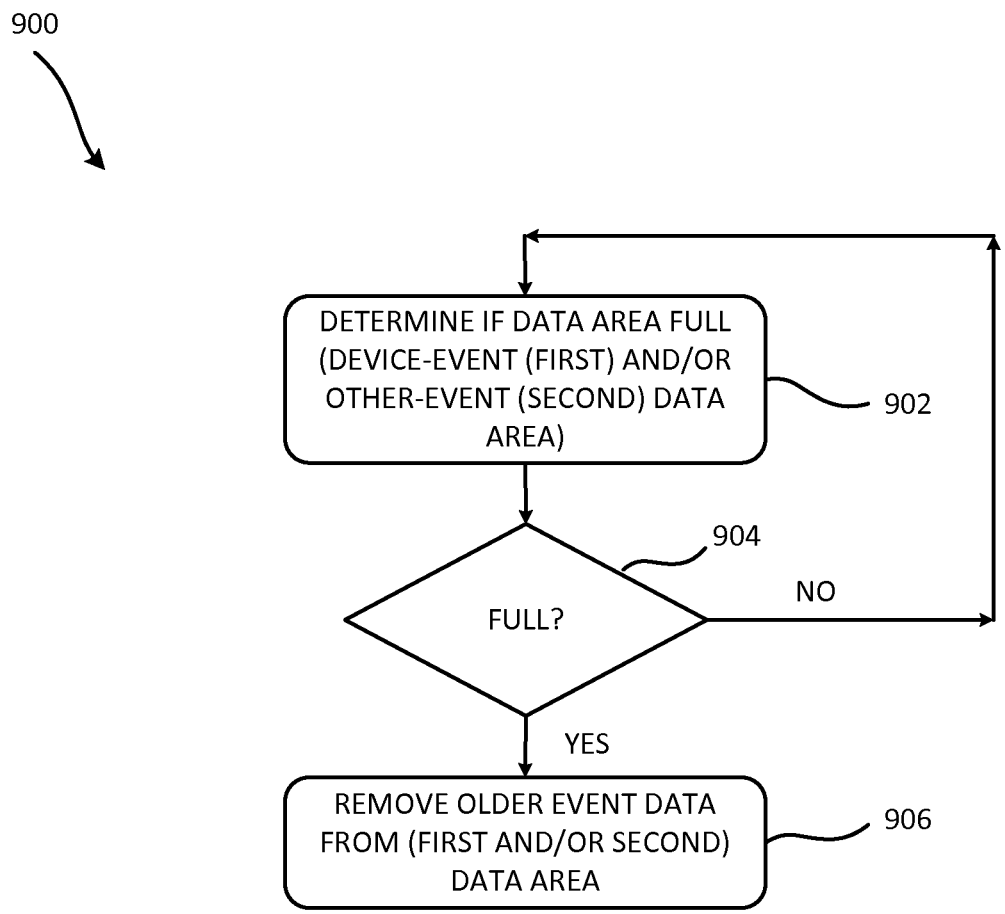
FIG. 9 is a flowchart of an exemplary process for ensuring that the storage layer of FIG. 3 does not overflow.

As controllers 210 generate and receive event data, controllers 210 may become overwhelmed with data (e.g., run out of memory). FIG. 9 is a flowchart of an exemplary process 900 for ensuring that storage layer 350 does not become overwhelmed with data (e.g., to prevent device-event area 369 and other-event area 368 from occupying more than the allocated memory space). Process 900 may be performed by control logic 322, distribution layer logic 340, and/or event handling application 328 running in controller 210. Process 900 may run as a background process continuously or periodically. In one embodiment, process 900 may run when event data is written to device-event area 369, other-event area 368, and/or device-event area 372. For example, controller 210 may execute process 900 after block 706, block 714, and/or block 712 in process 700, and/or block 806 of process 800.

Process 900 begins with a determination of whether a data area is full (block 902). A data area in this case may correspond to device-event area 369 (first data area), other-event area 368 (second data area), device-event area 372, and/or any other data area. In this embodiment, the different data areas may each have a maximum size. As stated above, for example, device-event area 369 (first data area) may occupy at most a first memory space and other-event event area 368 (second data area) may occupy at most a second memory space. The first memory space (belonging to device-event area 369) may be larger than the second memory space (belonging to other-event area 368). Alternatively, device-event area 369 in combination with device-event area 372 may be allocated more space than other-event area 368. If the data area is full, nearing full, or more than full (block 904: YES), then event data (e.g., older event data or the oldest event data) may be removed (block 906). For example, if controller 210-A is storing event data to device-event area 369 (first data area), but area 369 (first data area) exceeds its allocated maximum (first memory space), then controller 210 may remove older event data or the oldest event data to prevent device-event area 369 (first data area) from occupying more than its allocated maximum (first memory space). Likewise, if controller 210-A is storing event data to other-event area 368 (second data area), but area 368 (second data area) is reaching is allocated maximum (second memory space), then controller 210 may remove older event data or the oldest event data to prevent other-event area 368 (second memory space) from occupying more than its allocated maximum (second memory space). In one embodiment each unit (e.g., unit 115-A having controller 210-A) stores more event data about itself than other controllers 210. That is, the allocated maximum for each device-event area 369 (first memory space of first data area) may be larger than the allocated maximum for the corresponding other-event area 368 (second memory space of second data area).

According to process 900, therefore, controller 210-A may remove event data from the first data area (device-event area 369) to prevent the first data area (device-event area 369) from occupying more than the first memory space. Controller 210-A may also remove the event data from the second data area (other-event area 368) to prevent the second data area from occupying more than the second memory space. In one embodiment, controller 210 may remove the event data that is oldest from the first data area (device-event area 369) and may remove the event data that is oldest from the second data area (other-event area 368).

And according to processes 700 and 800, controller 210-A may distribute the event data from the first data area (device-event area 369) to the other controllers 210 through a network interface and to receive event data from the other controllers 210 through the network interface to store in the second data area (other-event area 368).

Figure 10:
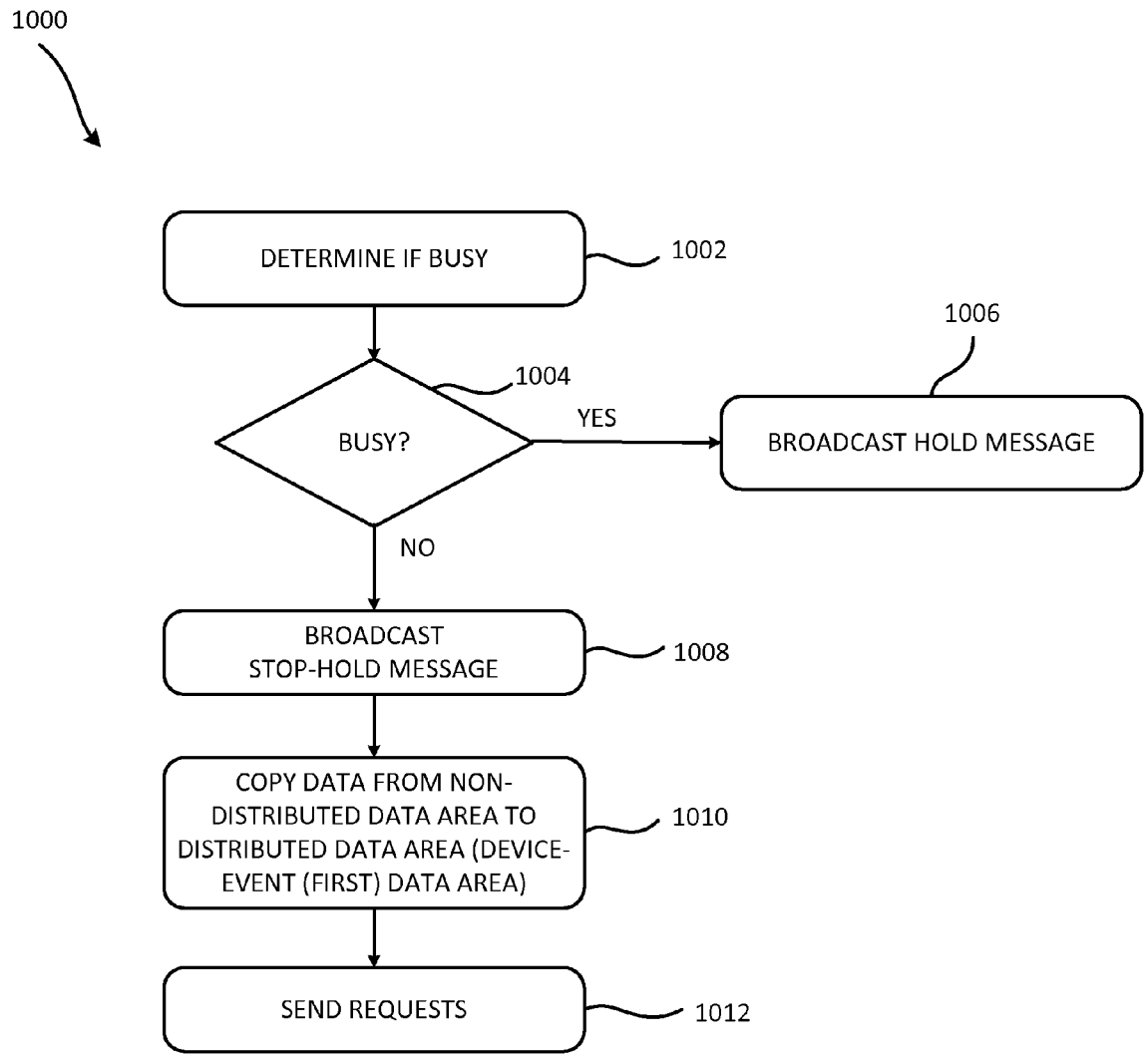
FIG. 10 is a flowchart of an exemplary process for distributing data of events in a distributed control system in one embodiment.

As discussed above, controller 210-A may distribute event data when it is not busy (or when it is less busy than it would be otherwise). FIG. 10 is a flowchart of an exemplary process 1000 for distributing events in a distributed control system based on whether a controller is busy in one embodiment. Process 1000 may be performed by control logic 322, distribution layer logic 340, and/or event handling application 328 running in controller 210, for example. Process 1000 may run as a background process continuously or periodically, for example.

In this example, process 1000 begins with a determination of whether controller 210-A is busy (block 1002). The determination of whether controller 210-A is busy is discussed above. In one embodiment, if controller 210-A is busy (block 1004: YES), then controller 210-A may broadcast a hold message to other controllers (e.g., controllers 210-B through 210-F). When other controllers 210-B through 210-F receive such an indication (e.g., the hold message), those other controllers 210-B through 210-F may stop sending or distributing some or all event data, such as lower priority data and/or information, to controller 210-A. In one embodiment, data and information stored in distributed in consensus data area 361 has a higher priority than data stored in non-consensus data area 363, for example. Prioritizing information related to data stored in consensus data area 361 over non-consensus data area 363 can reduce the chance of the consensus data area not achieving consensus with respect to data stored therein. Further, as described above, data of an event to which controller 210-A is associated with a subscription may be considered of a higher priority than data of an event to which controller 210-A is not associated with a subscription.

If controller 210-A is not busy (block 1004: NO), then controller 210-A may broadcast a stop-hold message to other controllers (e.g., controllers 210-B through 210-F) (block 1008) (e.g., particularly in the embodiment where controller 210-A broadcasted a hold message in block 1006). If controller 210-A is not busy (block 1004: NO), then controller 210-A may copy event data from non-distributed data area 370 to distributed data area 360 (e.g., device-event area 369 (first data area)) (block 1010). As described above, data saved in distributed data area 360 can be distributed by control logic 322 and/or distribution layer 340. The data copied from non-distributed data area 370 to distributed data area 360 can include data that was not saved to distributed data area 360 because controller 210-A was too busy (blocks 710: YES) and the information was stored instead to non-distributed data area 370. As discussed above, controller 210-A may send a request for the data of missed events (included the discarded data from block 810) when it is less busy (block 1012). In yet another embodiment, the event data may be resent by the other controllers 210 when controller 210-A is less busy. Other controllers 210 may determine that controller 210-A is less busy when activity from controller 210-A (e.g., transmitted events) decreases. Accordingly, the event data which controller 210 discards (block 810) or otherwise does not receive may eventually be requested by (or resent to) controller 210-A to help complete the event data in controller 210-A. As such, the distribution of event data is shifted in time from busy periods to non-busy periods.

According to processes 700, 800, and 1000 and the description above, controller 210-A may stop distributing event data from the first data area (device-event area 369) to another one of the controllers 210 when an indication is received through the communication network interface from the other one of the devices to stop distributing the event data. In one embodiment, the other one of the controllers 210 may indicate to stop distributing the event data when the processor in the corresponding other controller 210 exceeds a processor load threshold.

Figure 11:
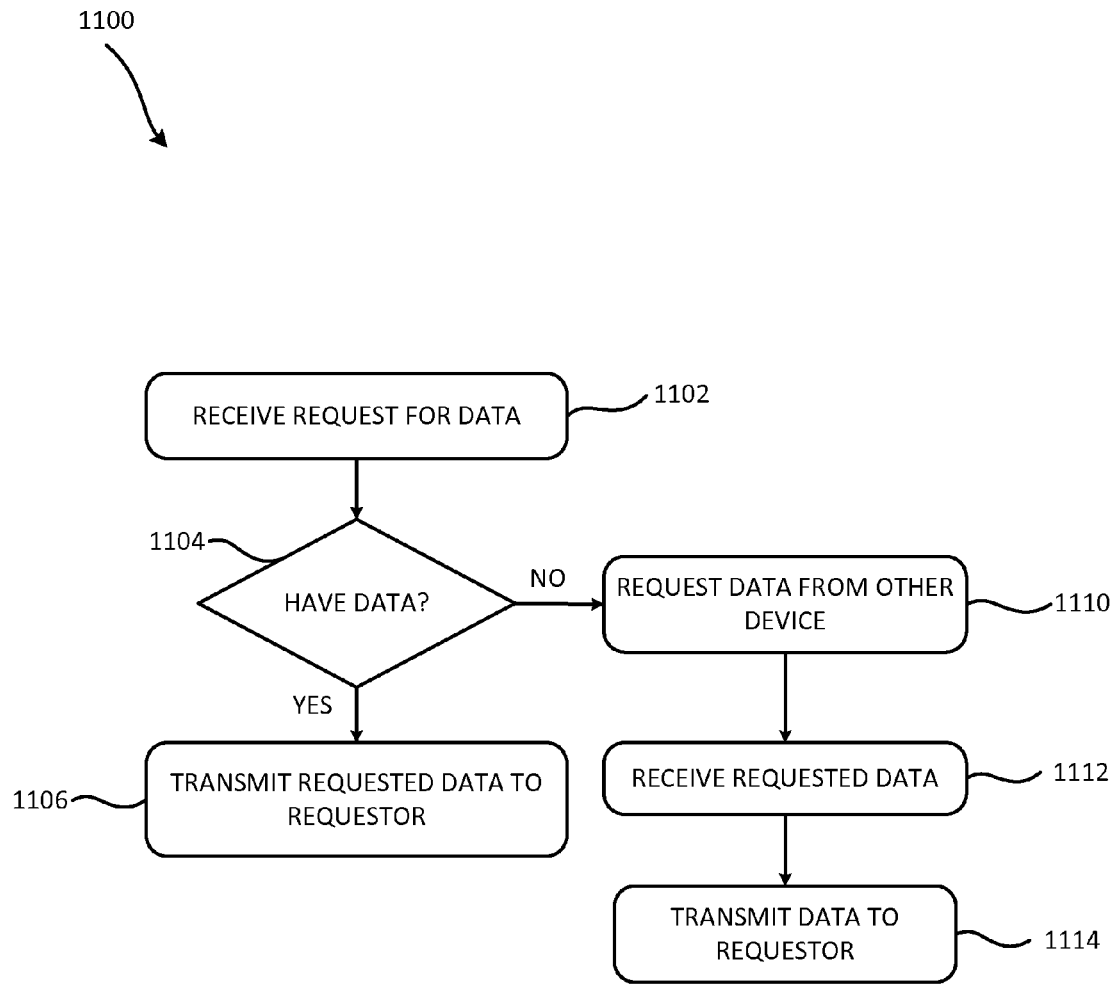
FIG. 11 is a flowchart of an exemplary process for an administrator to access data stored in the controllers of FIG. 1 in one embodiment.

One embodiment allows an administrator to use administration device 130 to log into a controller (e.g., any one of controllers 210-A through 210-F) to access data stored in any or all of the controllers 210. That is, an administrator can use administration device 130 to log into controller 210-A to access data stored in controller 210-A or any of controllers 210-B through 210-F. FIG. 11 is a flowchart of an exemplary process 1100 for an administrator to access data stored in controllers 210 in one embodiment. Process 1100 may be performed by control logic 322, distribution layer logic 340, and/or event handling application 328 running in controller 210, for example.

In this example, process 1100 begins with receiving a request for data (block 1102), such as event data. For example, an administrator uses administration device 130 to log into or communicate with any one of controllers 210 to request and receive event data in device-event area 369 (first data area), other-event area 368 (second data area), and/or device-event area 372. In one case, the administrator may wish to analyze and report on the requested data. Assume that the administrator logs into controller 210-A from administration device 130 (e.g., an additional device relative to system units 115). If controller 210-A has the requested data (block 1104: YES), then controller 210-A can transmit the requested data to the requesting device (e.g., administration device 130 or the "additional device") (block 1106). But, controller 210-A may not have all the requested event data stored in device-event area 369 (first data area), other-event area 368 (second data area), or device-event area 372 (e.g., the event data may not have been distributed to controller 210-A yet or may have been removed in controller 210-A during process 900 but stored elsewhere). If controller 210-A does not have the requested data (block 1104: NO), then controller 210-A can request the data from other controllers 210 (e.g., controllers 210-B through 210-F) (block 1110). Controller 210-A would then receive the requested data (block 1112) and transmit it to the requestor (block 1114). In one embodiment, controller 210-A may request other controllers 210-B through 210-F to send the relevant data to administration device 130 (e.g., directly) without passing the data through controller 210-A.

Accordingly, process 1100 discloses additional device (administration device 130) to communicate with one of the controllers 210 to request and receive the event data stored in the first data area (device-event area 369) or the event data stored in the second data area (other-event area 368).

This application incorporates by reference the following applications filed the same day as the present patent application: U.S. application Ser. No. 14/028,218, titled "Event Timeline Generation"; U.S. application Ser. No. 14/028,118, titled "Control System Configuration Within an Operational Environment"; U.S. application Ser. No. 14/028,236, titled "Anonymous Decisions in an Access Control System"; U.S. Application 14/028,243, titled "Consensus Loss in Distributed Control Systems"; U.S. application Ser. No. 14/028,059, titled "Joining a Distributed Database"; U.S. application Ser. No. 14/028,230, titled "Managing Application Data in Distributed Control Systems"; and U.S. application Ser. No. 14/028,208, titled "Distribution of User Credentials".

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7 and 8, the order of the blocks and/or signal flows may be modified in other implementations. Further, non-dependent blocks and/or signal flows may be performed in parallel.

In one embodiment, methods and systems may omit consensus data area 361 (e.g., and not include a consensus-based database). In another embodiment, methods and systems may not distribute device-event data area 369 and/or may not distribute other-event data area 368.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises" and "comprising," as used herein specify the presence of stated features, integers, steps or components but do not preclude the presence or addition of one or more other features, integers, steps, components or groups thereof. Further, the term "exemplary" (e.g., "exemplary embodiment," "exemplary configuration," etc.) means "as an example" and does not mean "preferred," "best," or likewise.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
a plurality of devices connected in a distributed peer-to-peer network, wherein each device of the plurality of devices includes:
a memory including a consensus data area and a non-consensus data area, wherein the plurality of devices are connected in the distributed peer-to-peer network to distribute data in the consensus data area and data in the non-consensus data area,
wherein the non-consensus data area includes a first data area and a second data area,
wherein the first data area is configured to store first event data originating from the device that corresponds to the memory and not from other devices of the plurality of devices, and the second data area is configured to store second event data originating from the other devices,
wherein the first data area is configured to occupy at most a first maximum memory space and the second data area is configured to occupy at most a second maximum memory space, and
wherein the first event data reports events that have occurred and the second event data reports events that have occurred; and
a processor to:
change data in the consensus data area and change data in the non-consensus data area, wherein the processor requires a quorum to change data in the consensus data area and does not require a quorum to change data in the non-consensus data area,
determine whether the first data area has reached the first maximum memory space and whether the second data area has reached the second maximum memory space,
remove the stored first event data having originated from the device that corresponds to the memory from the first data area to prevent the first data area from occupying more than the first maximum memory space when the processor determines that the first data area has reached the first maximum memory space,
remove the stored second event data having originated from the other devices from the second data area to prevent the second data area from occupying more than the second maximum memory space when the processor determines that the second data area has reached the second maximum memory space, and
distribute the first event data to the other devices through a network interface and receive second event data from the other devices through the network interface to store in the second data area.

2. The system of claim 1,
wherein each processor in more than one of the plurality of devices is configured to distribute the first event data to other devices in the peer-to-peer network, and
wherein each processor in more than one of the plurality of devices is configured to distribute the second event data to other devices in the peer-to-peer network.

3. The system of claim 2, wherein the processor is configured to:
determine if the device is busy;
stop distribution of the first event data to the other devices through the peer-to-peer network when the processor determines that the device is busy, and;
continue to store the first event data originating from the device in the first data area when the processor determines that the device is busy.

4. The system of claim 3, wherein the processor is configured to:
determine that another one of the devices is associated with a subscription to the first event data; and
send the first event data to the other one of the devices when the processor determines the device is busy and when the processor determines that the other one of the devices is associated with a subscription to the first event data.

5. The system of claim 3, wherein the processor is configured to determine whether the device is busy based on an amount of traffic in the network passing a first threshold, based on the load of the processor passing a second thresh-

23 old, or based on a number of events being processed by the processor passing a third threshold.

6. The system of claim 3,
wherein the first data area includes a volatile memory area and a non-volatile memory area; and
wherein the processor is configured to store the first event data in the volatile memory area when the processor determines that the device is busy and move the first event data to the non-volatile memory when the processor determines that the device is no longer busy.

7. The system of claim 3,
wherein when the processor determines that the device is busy, the processor is configured to continue to distribute data in the consensus data area while stopping to distribute data in the non-consensus data area;
wherein the processor is configured to determine that the first data area has reached the first maximum memory space when the first data area is full, near full, or more than full; and
wherein the processor is configured to determine that the second data area has reached the second maximum memory space when the second data area is full, near full, or more than full.

8. The system of claim 1,
wherein the first maximum memory space is larger than the second maximum memory space, and
wherein the first event data reports events that have occurred at the device and the second event data reports events that have occurred at the other devices of the plurality of devices.

9. The system of claim 8,
wherein the plurality of devices include a plurality of system units in a physical access control system (PACS),
wherein one of the system units includes a controller and a peripheral device,
wherein the first event data that reports events that have occurred at the system unit includes:
an indication that a reader device received a credential when the peripheral device is a reader device, or
an indication that a camera detected motion when the peripheral device is a camera, and
wherein the processor is configured to compare the first event data and the second event data to rules and issue an alarm based on the comparison.

10. The system of claim 1,
wherein the processor is configured to remove the first event data that is oldest from the first data area to prevent the first data area from occupying more than the first maximum memory space, and
wherein the processor is configured to remove the second event data that is oldest from the second data area to prevent the second data area from occupying more than the second maximum memory space.

11. The system of claim 1, wherein the processor is configured to stop distributing the first or second event data to another one of the devices when an indication is received through the network interface from the other one of the devices to stop distributing the first or second event data to the other one of the devices.

12. The system of claim 1,
wherein the consensus data area includes a database of user credentials for users to access a physical area.

13. The method of claim 1,
storing a database of user credentials for users to access a physical area in the consensus data area.

24

14. A device comprising:
a memory including a consensus data area and a non-consensus data area, wherein the device is configured to be connected in a distributed peer-to-peer network to distribute data in the consensus data area and data in the non-consensus data area,
wherein the non-consensus data area includes a first data area and a second data area,
wherein the first data area is configured to store first event data originating from the device and not originating from one or more other devices connected in the peer-to-peer network with the device, and
wherein the second data area is configured to store second event data originating from the one or more other devices connected in the peer-to-peer network with the device,
wherein the first data area is configured to occupy at most a first maximum memory space and the second data area is configured to occupy at most a second maximum memory space, and
wherein the first event data reports events that have occurred and the second event data reports events that have occurred; and
a processor to:
change data in the consensus data area and change data in the non-consensus data area, wherein the processor requires a quorum to change data in the consensus data area and does not require a quorum to change data in the non-consensus data area,
determine whether the first data area has reached the first maximum memory space and whether the second data area has reached the second maximum memory space,
remove the stored event data having originated from the device from the first data area to prevent the first data area from occupying more than the first maximum memory space when the processor determines that the first data area has reached the first maximum memory space,
remove the stored event data from the second data area to prevent the second data area from occupying more than the second maximum memory space when the processor determines that the first data area has reached the first maximum memory space, and
distribute, through a network interface, the first event data to the other devices and receive, through the network interface, the second event data from the other devices to store in the second data area.

15. The device of claim 14,
wherein the processor is configured to distribute the first event data to the one or more other devices in the peer-to-peer network,
wherein the processor is configured to distribute the second event data to the one or more other devices in the peer-to-peer network, and
wherein the first maximum memory space is larger than the second maximum memory space.

16. The device of claim 15,
wherein the device is a system unit in a physical access control system (PACS), wherein the system unit includes a controller and a peripheral device,
wherein the first event data reports events that have occurred at the system unit and the second event data reports events that have occurred at the one or more other devices in the peer-to-peer network, and
wherein the first event data that reports events that have occurred at the system unit includes: an indication that a reader device received a credential when the peripheral device is a reader device, or an indication that a camera detected motion when the peripheral device is a camera.

17. The device of claim 15, wherein the processor is configured to:
determine if the device is busy and determine that another one of the devices is associated with a subscription to the first event data;
stop distribution of the first event data to the other devices through the peer-to-peer network when the processor determines that the device is busy,
continue to store the first event data originating from the device in the first data area when the processor determines that the device is busy,
send the first event data to the other one of the devices when the processor determines that the device is busy and that the other one of the devices is associated with a subscription to the first event data.

18. The device of claim 17, wherein the processor is configured to determine if the device is busy based on an amount of traffic in the peer-to-peer network passing a first threshold, based on the load of the processor passing a second threshold, or based on a number of events being processed by the processor passing a third threshold.

19. The device of claim 14,
wherein the processor is configured to compare first event data and the second event data to rules and issue an alarm based on the comparison,
wherein the processor is configured to remove the first event data that is oldest from the first data area to prevent the first data area from occupying more than the first maximum memory space, and
wherein the processor is configured to remove the second event data that is oldest from the second data area to prevent the second data area from occupying more than the second maximum memory space.

20. The device of claim 14,
wherein the consensus data area includes a database of user credentials for users to access a physical area.

21. A method comprising:
storing first event data originating from a first device of a plurality of devices, and not originating from devices other than the first device, in a first data area of a memory,
wherein the memory includes a consensus data area and a non-consensus data area,
wherein the plurality of devices are connected in a distributed peer-to-peer network to distribute data in the consensus data area and data in the non-consensus data area,
wherein the non-consensus data area includes the first data area and a second data area,
wherein the first data area is configured to occupy at most a first maximum memory space, wherein the first event data reports events that have occurred;
storing second event data originating from the devices other than the first device in the second data area, wherein the second data area is configured to occupy at most a second maximum memory space, and wherein the second event data reports events that have occurred;
changing data in the consensus data area, wherein changing the data in the consensus data area requires a quorum, and changing data in the non-consensus data area, wherein changing the data in the non-consensus data area does not require a quorum;
determining whether the first data area has reached the first maximum memory space and determining whether the second data area has reached the second maximum memory space;
removing the first event data from the first data area to prevent the first data area from occupying more than the first maximum memory space when determined that the first data area has reached the first maximum memory space;
removing the second event data from the second data area to prevent the second data area from occupying more than the second maximum memory space when determined that the second data area has reached the second maximum memory space; and
distributing the first event data to the other devices through a network interface and receiving the second event data from the other devices through the network interface to store in the second data area.

22. The method of claim 21,
wherein the first maximum memory space is larger than the second maximum memory space,
wherein the first device is a system unit in a physical access control system (PACS), wherein the system unit includes a controller and a peripheral device,
wherein the first event data reports events that have occurred at the system unit and the second event data reports events that have occurred at the devices other than the first device, and
wherein the first event data that reports events that have occurred at the system unit includes: an indication that a reader device received a credential when the peripheral device is a reader device, or an indication that a camera detected motion when the peripheral device is a camera.

23. The method of claim 21,
removing the first event data that is oldest from the first data area to prevent the first data area from occupying more than the first maximum memory space, and
removing the second event data that is oldest from the second data area to prevent the second data area from occupying more than the second maximum memory space.

24. The method of claim 23, further comprising:
determining if the device is busy and determining that another one of the devices is associated with a subscription to the first event data;
stopping the distribution of the first event data to the other devices through the peer-to-peer network when determined that the device is busy,
continuing to store the first event data originating from the device in the first data area when determined that the device is busy,
sending the first event data to the other one of the devices when determined that the device is busy and that the other one of the devices is associated with a subscription to the first event data.

* * * * *